United States Patent
Muramoto et al.

(10) Patent No.: US 7,167,262 B2
(45) Date of Patent: Jan. 23, 2007

(54) PRINTING SYSTEM AND METHOD

(75) Inventors: Michiko Muramoto, Ashigarakami-gun (JP); Koichi Yoshimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 888 days.

(21) Appl. No.: 10/097,359

(22) Filed: Mar. 15, 2002

(65) Prior Publication Data
US 2003/0053118 A1   Mar. 20, 2003

(30) Foreign Application Priority Data
Sep. 19, 2001   (JP)   ............... 2001-284248

(51) Int. Cl.
*G06F 3/12*   (2006.01)
*G06F 15/00*   (2006.01)
(52) U.S. Cl. .................... 358/1.15; 358/1.13
(58) Field of Classification Search ............ 358/1.15, 358/448, 3.24, 1.6, 1.1, 1.13, 1.14, 1.2, 1.3, 358/1.4, 1.5, 1.7, 1.8, 1.9, 1.11, 1.12, 1.16, 358/1.17, 1.18, 405, 407, 468
See application file for complete search history.

(56) References Cited

U.S. PATENT DOCUMENTS

| | | | |
|---|---|---|---|
| 6,775,023 B1 * | 8/2004 | Fukunaga et al. | 358/1.15 |
| 6,822,754 B1 * | 11/2004 | Shiohara | 358/1.15 |
| 2005/0213152 A1 * | 9/2005 | Suzuki et al. | 358/1.15 |

FOREIGN PATENT DOCUMENTS

JP   A 10-207657   8/1998

* cited by examiner

*Primary Examiner*—Dov Popovici
(74) *Attorney, Agent, or Firm*—Oliff & Berridge, PLC

(57) ABSTRACT

When a client device issues a print request, a processing procedure generator outputs processing procedure data indicating a procedure of processing to a device that acquires the print data indicated by the processing procedure data, and sends the print data along with the processing procedure data to a processor. The processor performs N-up etc. indicated by a command of the processing procedure data with respect to the print data body and further, a processor performs format conversion with respect to the print data body, and performs sending to a printer. The printer prints the processed print data.

20 Claims, 19 Drawing Sheets

SINGLE STAGE CONVERSION

MULTIPLE STAGE CONVERSION

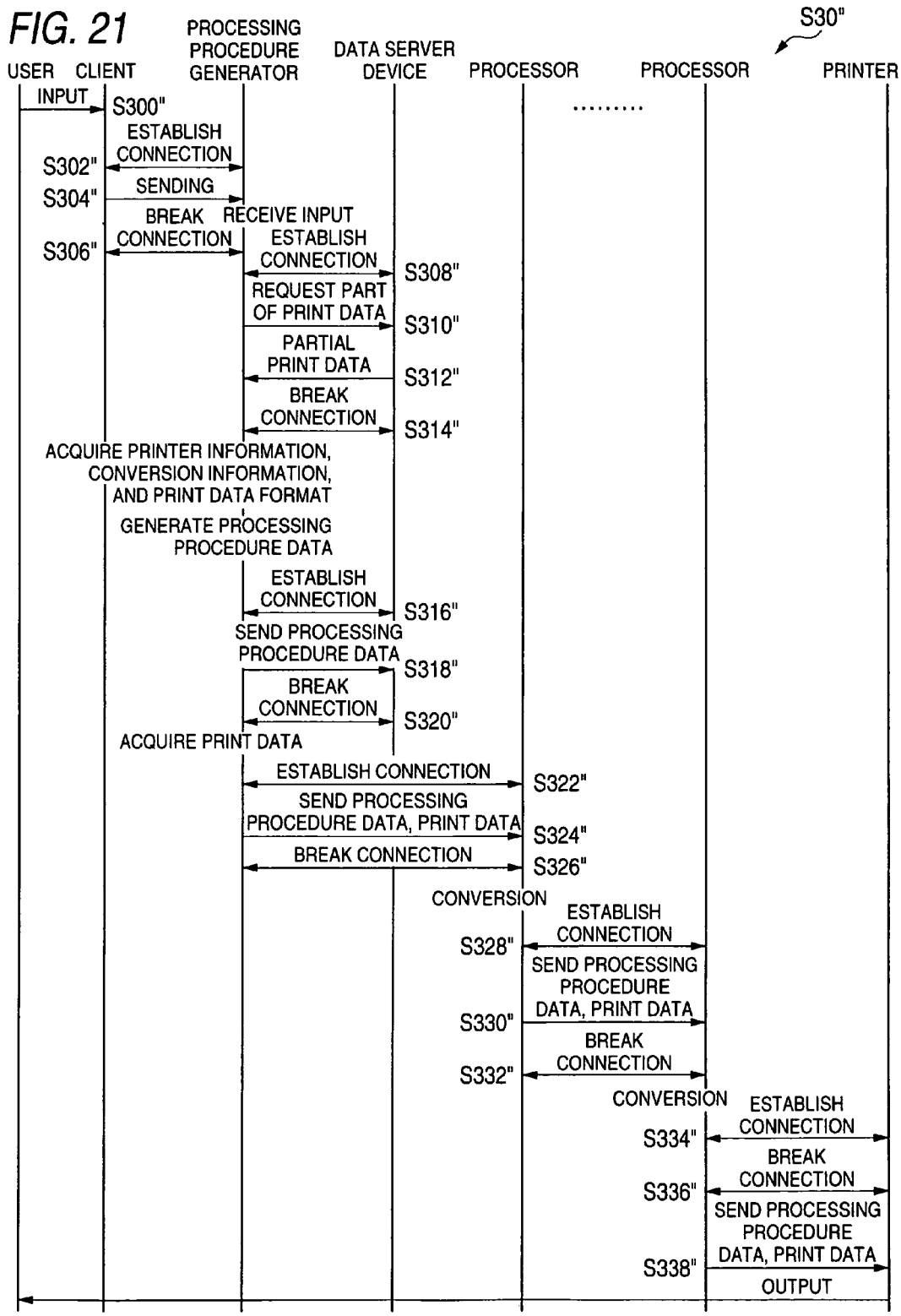

PRINTING SYSTEM AND METHOD

BACKGROUND OF THE INVENTION

1. Field of the Invention

The present invention relates to a printing system for requesting processing and printing with respect to a processor and a printer, which are connected to each other through a network to make the processor and the printer perform processing and printing of data to be printed and a method therefor.

2. Description of the Related Art

When print data is acquired from a data server device connected to a network and is printed, a place of the print data, a printer of a print destination and an application capable of converting the print data into a format suitable for the printer are required.

That is, as the necessary minimum number of configurations for printing, a client device for issuing a print request of print data by an operation of a user, a data server device for holding the print data, a printer for doing printing and further the application for making the conversion described above are required.

As a matter of course, the application for conversion and the print data must together reside in a node such as a client device in order to convert the print data into the format suitable for the printer.

When it is known whether the node in which the application resides is a client device or a printer, the following two methods for this conversion can be given.

That is, a push type method (for example, lpr of RFC1179) in which an application resides in a client device and print data is converted in the client device and the converted print data is sent to a printer can be given as a first method. A pull type method (for example, ipp of IRTF) in which an application resides in a printer and conversion processing is performed with respect to print data brought by the printer also can be given as a second method.

First, the push type method will be described with reference to FIG. 1.

FIG. 1 is a diagram showing push type processing for converting print data.

As shown in FIG. 1, in the push type method, a client device first requests print data with respect to a data server device (FIG. 1 (1)) and acquires the print data from the data server device (FIG. 1(2)).

Next, a client performs conversion processing using an application for conversion processing and converts the print data into a format suitable for a printer.

Further, the client sends the converted print data to the printer and does printing (FIG. 1(3)).

Next, the pull type method will be described with reference to FIG. 2.

FIG. 2 is a diagram showing pull type processing for converting print data.

Unlike the push type method, in the pull type method shown in FIG. 2, a client device first requests a printer of printing of print data (FIG. 2(1)).

Then, the printer requests a data server device of the print data (FIG. 2(2)) and acquires the print data (FIG. 2(3)).

Further, the printer converts the print data using an application provided them and does printing.

In order to use the push type method, the client device needs to know that which of the data server device the print data resides (a place of the print data), that which printer performs printing (a print destination) and that an application capable of conversion resides in a client.

Also, it is necessary to acquire the print data from the data server device and to perform conversion processing, so that a processing load of the client device is large and during these processing, many machine powers can be spent in other processing.

Also, in the case of performing plural conversion processing, it is necessary to provide all the applications for performing these conversion processing in the client device.

In the case of using the pull type method, the client device needs to know a place of the print data and a print destination, but does not need to know a place where an application resides. Also, the printer needs to recognize that an application for conversion is provided therein.

Also, as a matter of course, the print data cannot be printed unless an application is provided in the printer.

As became evident from the above description, even in the case of using the push type or the case of using the pull type, the application for conversion processing must be provided in the client device or the printer.

A system capable of converting and printing print data without providing the application for conversion processing in the client device or the printer will be described below with reference to FIG. 3.

FIG. 3 is a diagram showing a method (single stage conversion method) for doing printing using a processor.

In the single stage conversion method shown in FIG. 3, a printer first acquires print data as with the pull type method (FIG. 3(1) to FIG. 3(3)).

Next, when it is decided that the print data acquired by the printer is described in a format incapable of interpretation, it is searched whether there is a processor in which an application for performing conversion processing is provided, and the print data is sent to the processor found as a result of the search, and the conversion is requested (FIG. 3(4)).

The processor receives the print data and performs the conversion processing and when returning the converted print data to the printer (FIG. 3(5)), the printer prints the converted print data.

According to the single stage conversion method shown in FIG. 3, it is unnecessary to provide the application for conversion processing in a client or the printer and also, the conversion processing can be performed with respect to the print data even when a client device does not know the presence of the application.

Therefore, the client device can print the print data as long as the client device knows a place of the print data and a print destination.

For example, a method in which a network printer receives a print request from a client device and requests sending of a document from a file server and prints the document processed by a conversion processing server in a network to which the client device, the file server, the conversion processing server and the network printer are connected is disclosed in JP-A-10-207657.

However, in the single stage conversion method shown in FIG. 3, all the conversion processing of the print data read from the data server device must be processed and printed by one processor, so that conversion processing which is not provided in the processor cannot be performed as a matter of course.

Also, for example, in the case that the printer of FIG. 3 can print the print data with a format C and the data server device holds the print data with a format A, even when there is no application for converting the format A into the format C, for example, by converting the print data with the format A into an intermediate format B and further converting the format B into the format C, the print data suitable for the printer can be generated.

However, according to the single stage conversion method shown in FIG. 3, multistage conversion processing for converting the print data into the intermediate format once and further converting it into the final format in this manner cannot be performed.

Therefore, many kinds of applications must be provided in the processor, and large effort and cost are required in order to create such an application for conversion processing.

For example, when a function of N-up for combining plural sheets of print data into one sheet to do printing wants to be performed by a printer without such a function, first, it is necessary to perform processing of the N-up with respect to the print data and further convert the processed print data into formats such as PS, PCL or PDL suitable for the printer.

Such multistage processing cannot be implemented by the single stage conversion method shown in FIG. 3, and large effort and cost are required in order to create a program in which the N-up function is integrated with conversion processing into the formats such as PS.

Also, for example, a user can operate the client device every one conversion to perform the multistage processing, but such operations put a large burden on the user.

When the multistage processing includes image conversion involving irreversible deformation such as compression, color conversion, scaling, noise rejection, or encryption, it is necessary to perform conversion processing in such order that information loss from the original print data is suppressed as low as possible. This is a problem.

Furthermore, when a necessary application for conversion processing is not present in the network, optimum conversion order can not be determined because of avoiding this processing conversion. This is also a problem.

SUMMARY OF THE INVENTION

[Printing System]

In order to achieve the objects, there is provided a printing system having:
  a processing procedure generator;
  at least one processor;
  a printer; and
  a data server device storing the print data,
  wherein the processing procedure generator, the at least one processor, the printer, and the data server device are connected to each other through a network;
  wherein the processing procedure generator has:
    a processing procedure generation section for generating processing procedure data indicating a procedure for processing print data to be printed by the at least one processor; and
    a processing procedure sending section for sending the generated processing procedure data to the data server device;
  wherein the data server device has:
    a processing procedure receiving section for receiving the processing procedure data;
    a print data acquisition section for acquiring the print data; and
    a processing sending section for sending the processing procedure data and the print data to the processor which first performs processing with respect to the print data;
  wherein each of the at least one processors has:
    a first receiving section for receiving the sent processing procedure data and the print data;
    a processing section for performing a predetermined processing with respect to the received print data; and
    a first sending section for sending the processed print data and the received processing procedure data to one of the processor which next performs processing and the printer in accordance with the processing procedure data; and
  wherein the printer receives and prints the processed print data.

Preferably, the printing system further has a client device for requesting the processing procedure generator to process and print the print data,
  wherein the processing procedure generator further has
    a first database section for recording processing performed by combining the printer and the at least one processor and processing performed by each of the at least one processor; and
    a request receiving section for receiving a request of the processing and printing; and
  wherein the processing procedure generation section retrieves the first database section based on the received request to generate the processing procedure data indicating the processing procedure for processing the print data.

Preferably, there is provided the printing system,
  wherein the processing procedure generation data comprises:
    device data specifying at least one of the at least one processor and the printer; and
    processing data specifying processing with respect to the print data performed by the specified at least one of the at least one processor and the printer;
    and the specified processor performs the processing specified by the processing data with respect to the received print data and sends the processed print data and the processing procedure data to one of the processor which next performs processing and the printer and is specified by the device data.

Preferably, there is provided the printing system, wherein the specified processor adds to the processing procedure data completion data indicating that processing with respect to the print data by the specified processor is completed.

Preferably, there is provided the printing system, wherein the specified processor adds to the processing procedure data completion data indicating that processing with respect to the print data by the specified processor is completed.

[Program]

According to the invention, there is provided a program for making a computer perform the steps of:
  generating processing procedure data indicating procedure of process by at least one device with respect to print data to be printed; and
  sending the generated processing procedure data to a device which first processes with respect to the print data.

BRIEF DESCRIPTION OF THE DRAWINGS

FIG. 21 is a diagram showing a communication sequence (S30") of the printing system (FIG. 20).

DETAILED DESCRIPTION OF THE PREFERRED EMBODIMENTS

The objects of the invention are (1) to be able to do printing even when an application for performing conversion processing does not reside in a printer or a client device, (2) to be able to perform multistage conversion processing, (3) that the printer receives only print data in a format capable of interpretation, (4) to be able to know whether or not the final printing can be done before performing conversion processing, (5) to be able to do printing as long as a user knows some information about a place of the print data and printing or the printer even when the user does not know which processor the application for performing conversion processing resides in, and (6) that as long as a user first performs an operation for printing, thereafter, there is no need to execute print processing by a main routine for printing or perform an operation for advancing the print processing by the user oneself.

Figure 1:
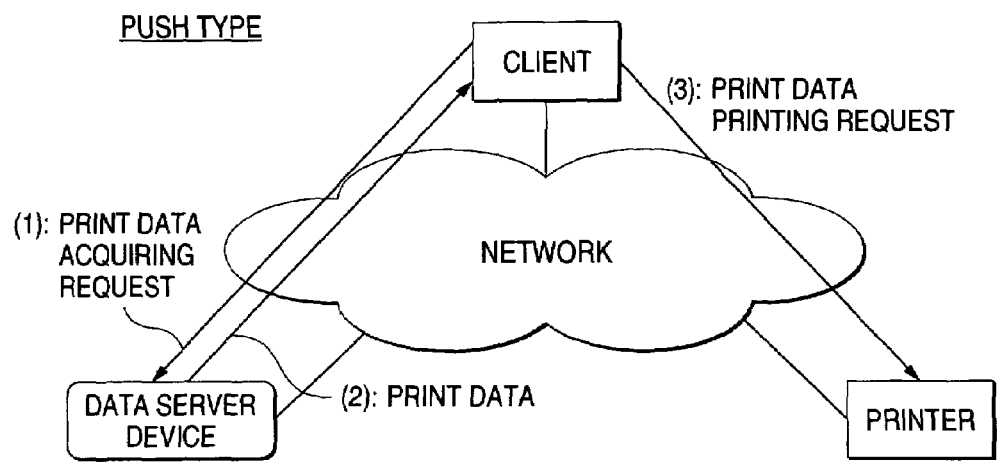
FIG. 1 is a diagram showing push type processing for converting print data.
Figure 2:
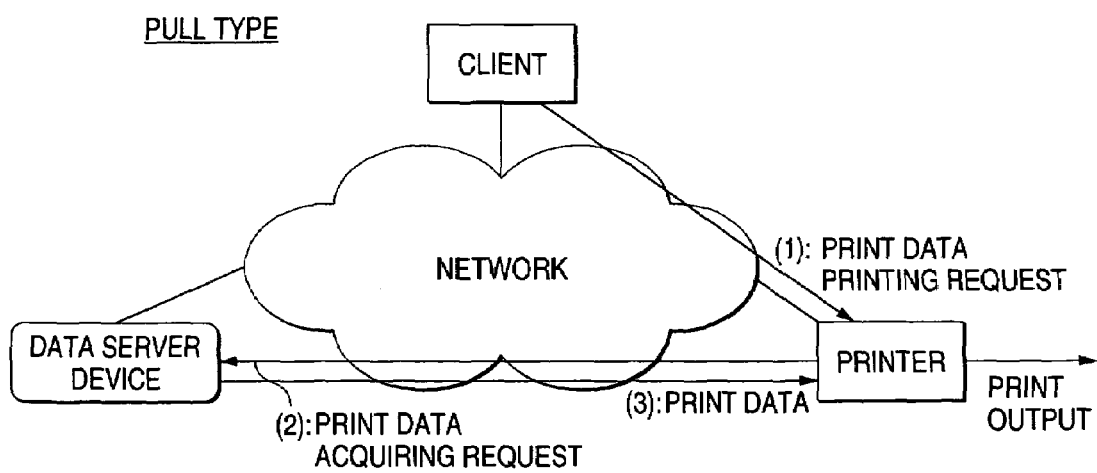
FIG. 2 is a diagram showing pull type processing for converting print data.
Figure 3:
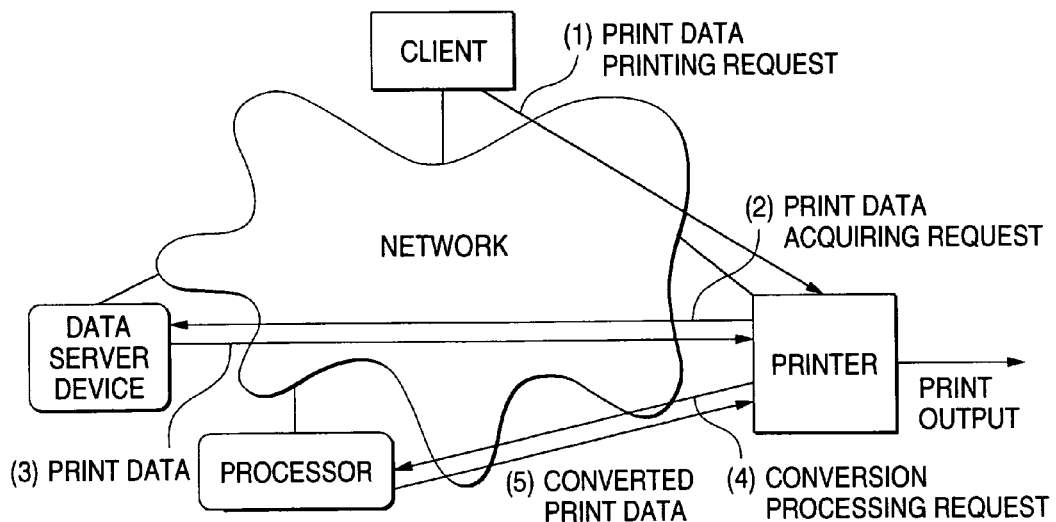
FIG. 3 is a diagram showing a method (single stage conversion method) for doing printing using a processor.
Figure 4:
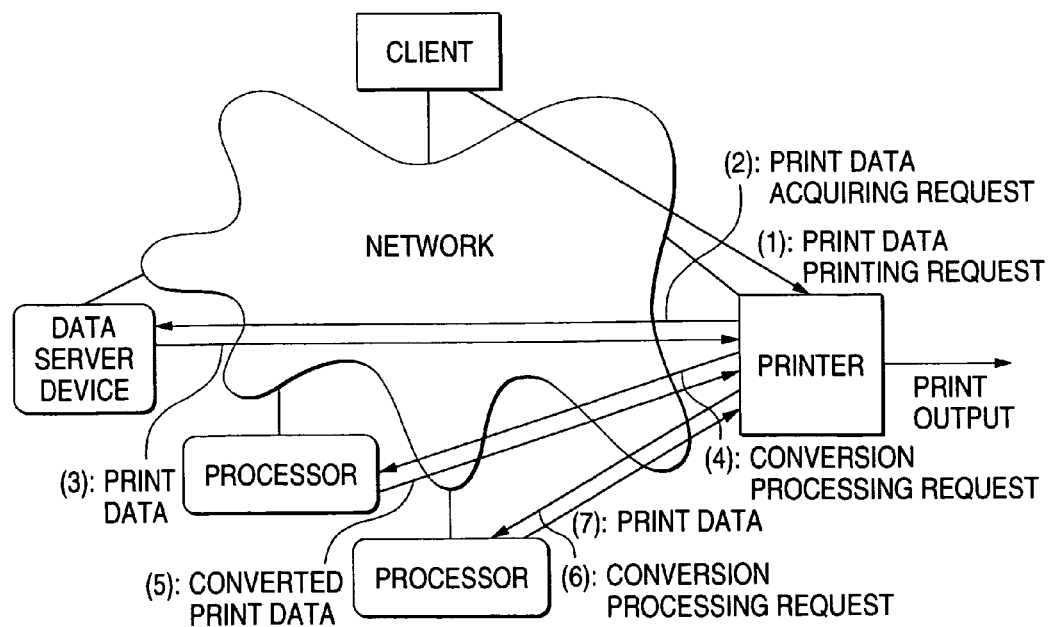
FIG. 4 is a diagram showing a method (multistage conversion method) for doing printing using plural processors.
Figure 5:
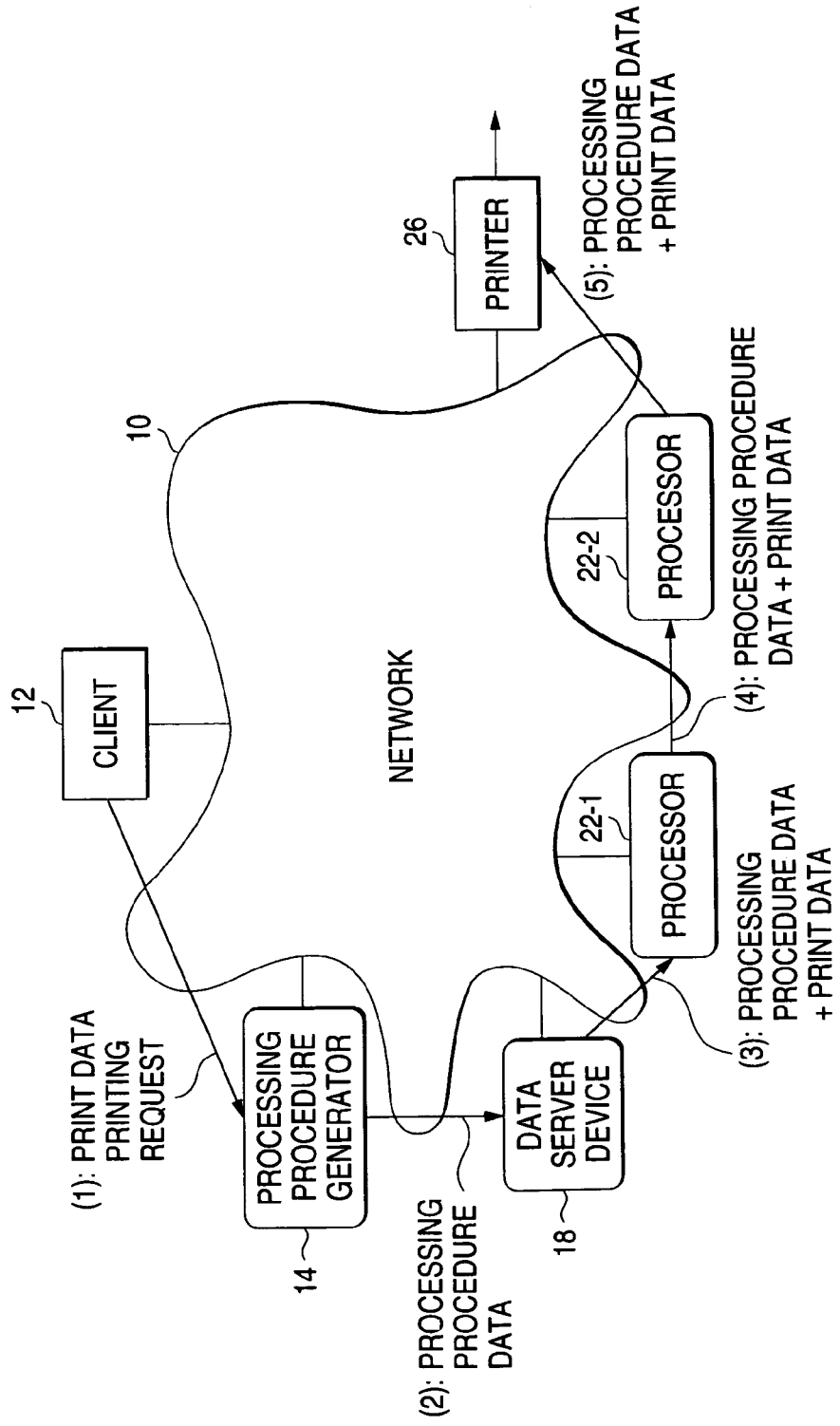
FIG. 5 is a diagram illustrating a printing system for implementing a printing method according to the invention.

FIG. 5 is a diagram illustrating a printing system for implementing a printing method according to the invention.

As shown in FIG. 5, for example, in the printing system a client device 12, a processing procedure generator 14, a data server device 18, n units of processors 22-1 to 22-n (where n is integer and in an illustration of FIG. 5, n=2) and a printer 26 are connected through a network 10.

For example, the printing method according to the invention is constructed so that in the printing system shown in FIG. 5, rather than making a decision whether or not printing can be done every time conversion processing necessary for printing is performed one by one, print data is first converted into a format capable of printing and then a printer receives the converted print data and does printing.

First Embodiment

A first embodiment of the invention will be described below.

Figure 6:
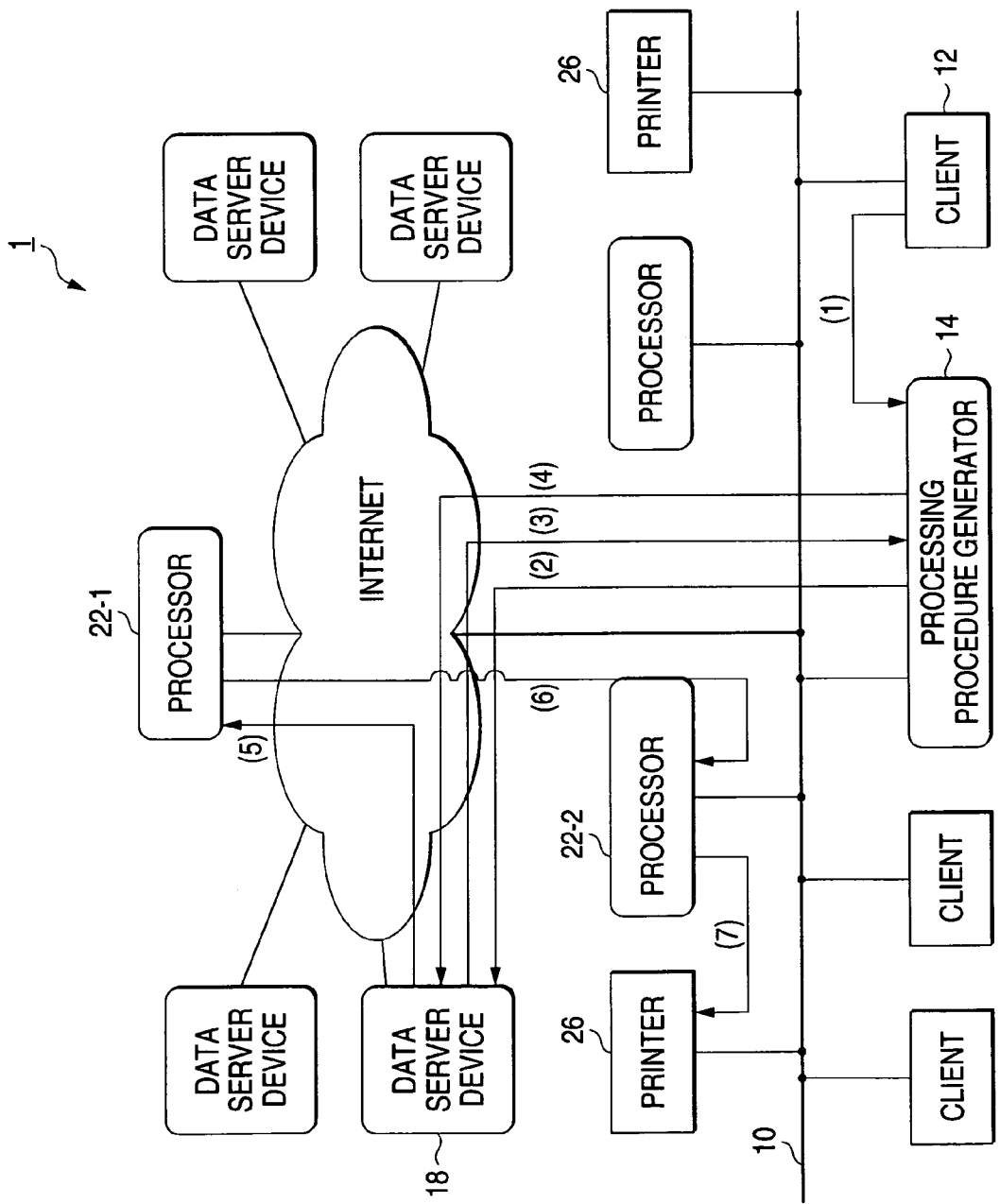
FIG. 6 is a diagram showing a configuration of a first printing system according to the invention.

FIG. 6 is a diagram showing a configuration of a first printing system 1 according to the invention.

As shown in FIG. 6, the printing system 1 is constructed by connecting client devices 12, a processing procedure generator 14, data server devices 18, n units of processors 22 and printers 26 through a network 10.

[Client Device 12]

Figure 7:
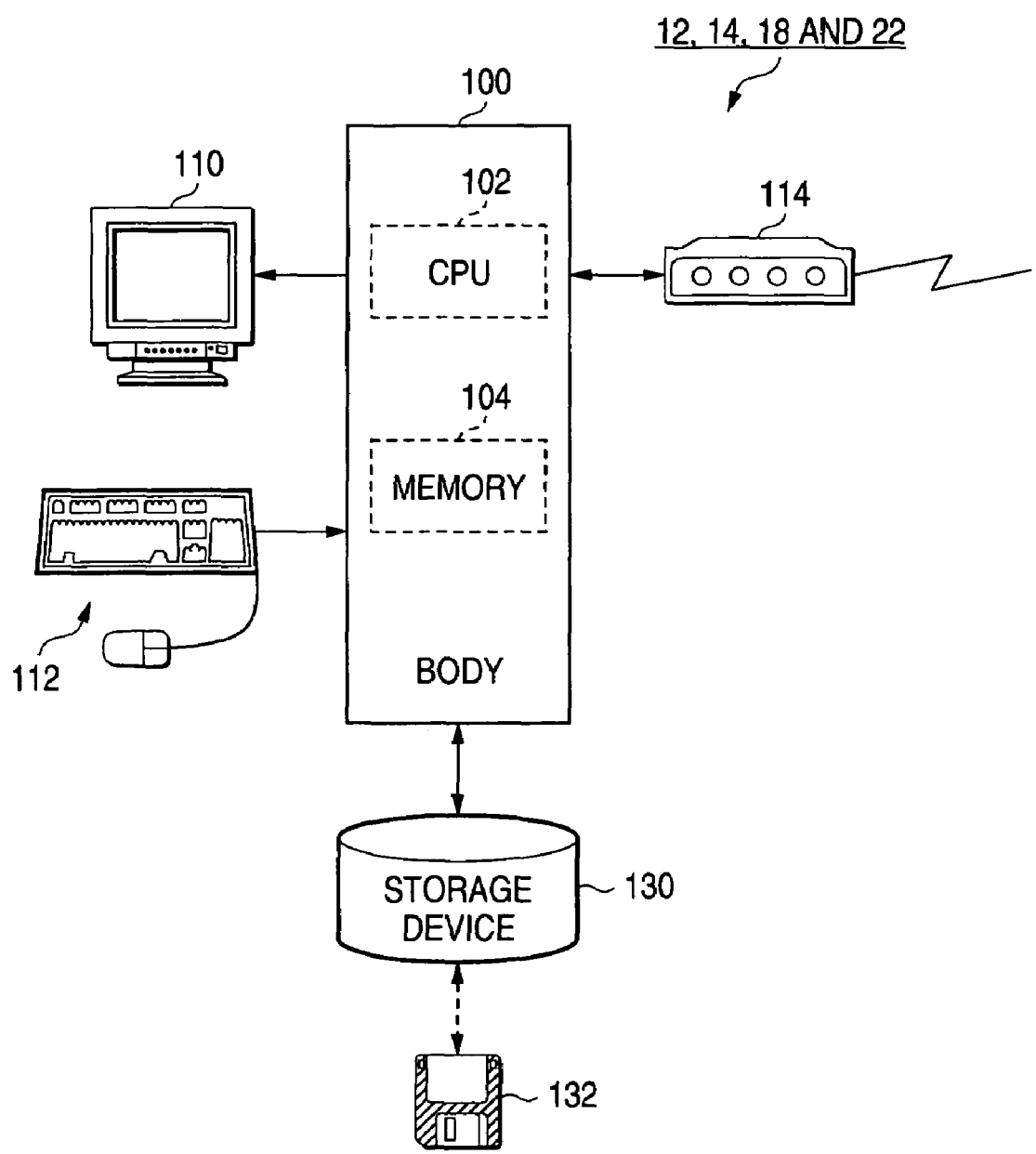
FIG. 7 is a diagram showing a hardware configuration of a client device (a processing procedure generator, a data server device and a processor) shown in FIG. 5.

FIG. 7 is a diagram showing a hardware configuration of the client devices 12, the processing procedure generator 14, the data server devices 18 and the processors 22 (hereinafter merely called "processors 22" in the case of showing any of processors 22-1 to 22-n without identification) shown in FIG. 6.

As shown in FIG. 7, the client device 12 comprises a body 100 including a CPU 102 and memory 104, a display device 110 such as a CRT display, an input device 112 such as a keyboard and a mouse, a communication device 114 for conducting communication with the network 10, and a storage device 130 such as a hard disk drive (HDD) and a CD-RW device.

That is, the client device 12 has a configuration acting as a general computer having a function of network communication with the network 10.

Incidentally, as described above, the processing procedure generator 14, the data server device 18 and the processor 22 also have a configuration similar to that of the client device 12.

Figure 8:
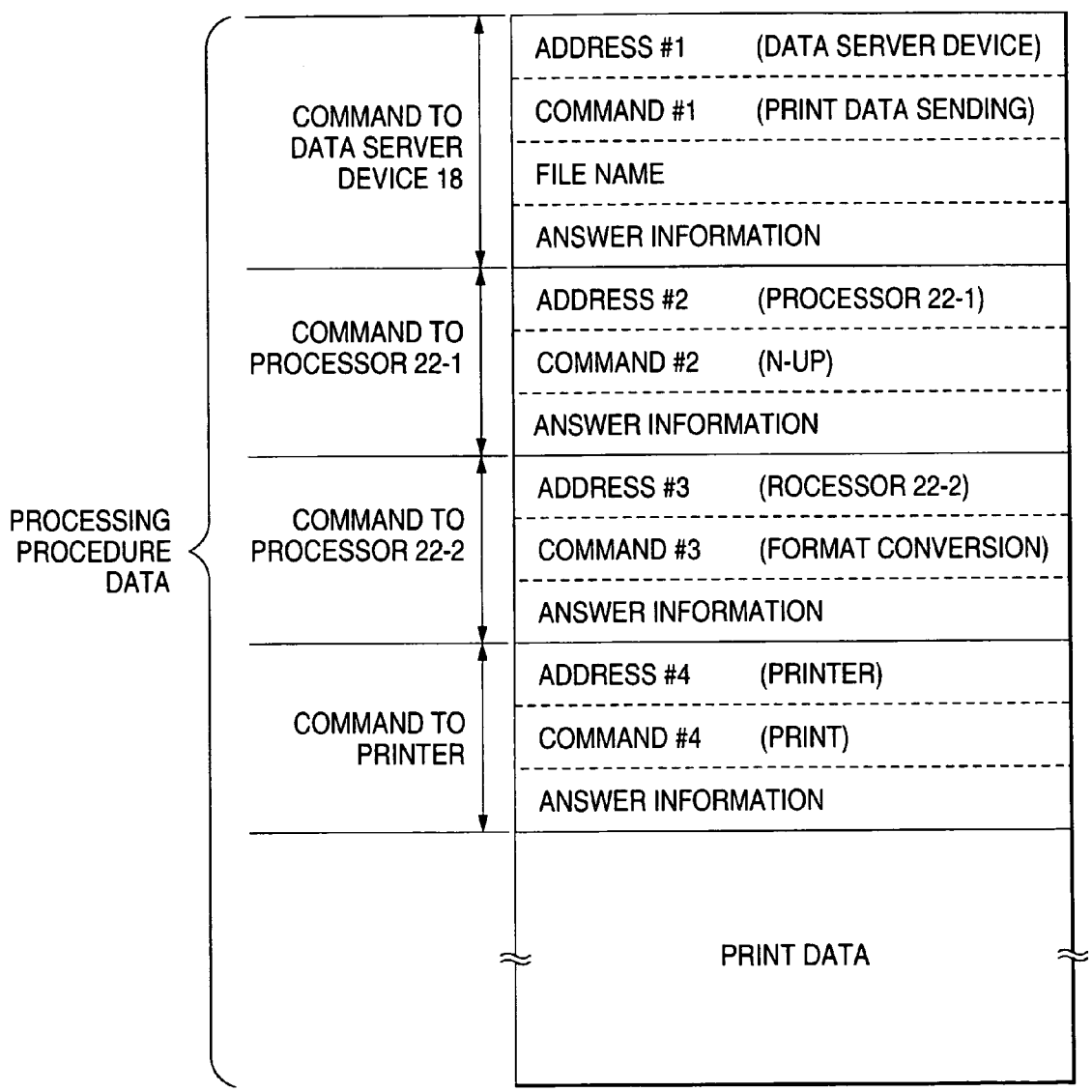
FIG. 8 is a diagram illustrating processing procedure data generated by the processing procedure generator shown in FIG. 5.

FIG. 8 is a diagram illustrating processing procedure data generated by the processing procedure generator 14 shown in FIG. 6.

In response to an operation of a user with respect to the input device 112, as shown in FIG. 6(1), the client device 12 communicates with the processing procedure generator 14 through the network 10, and issues a print request including a name of print data to be printed and information (specified information) that specifies processing (conversion processing of a format and N-up processing, etc.) to be performed to the print data with respect to the processing procedure generator 14.

The specified information includes, for example, a print state desired by a user, information necessary for the processing procedure generator 14 to generate the processing procedure data shown in FIG. 8, namely a name of print data, processing information showing processing such as N-up and format conversion performed to the print data, and information that specifies a command (printing) to a printer.

[Processing Procedure Generator 14]

The processing procedure generator 14 (FIG. 6) stores information indicating which processing any of the processors 22 can perform and which print data is held in any of the data server devices 18.

The processing procedure generator 14 determines that a name of print data included in specified information inputted from the client device 12 and the print data are held in the data server device 18 and N-up processing can be performed by the processor 22-1 and format conversion processing can be performed by the processor 22-2.

Based on the determination, the processing procedure generator 14 further generates processing procedure data including an address for specifying a device to perform processing, a command for specifying processing to be performed by a device, a name indicated by print data to be printed and answer information into which a result of processing is written every device in order of processing as illustrated in FIG. 8.

In an example shown in FIG. 6, after the processing procedure generator 14, print data is acquired from the data server device 18 and processing is performed in order of the processor 22-1, the processor 22-2 and the printer 26, so that commands to each the device are held in the processing procedure data in this order as illustrated in FIG. 8.

The processing procedure generator 14 sends the generated processing procedure data to the data server device 18 through the network as shown in FIG. 6(4).

The operations of the processing procedure generator 14 described above will be described in detail further with reference to FIGS. 9 and 10.

Figure 9:
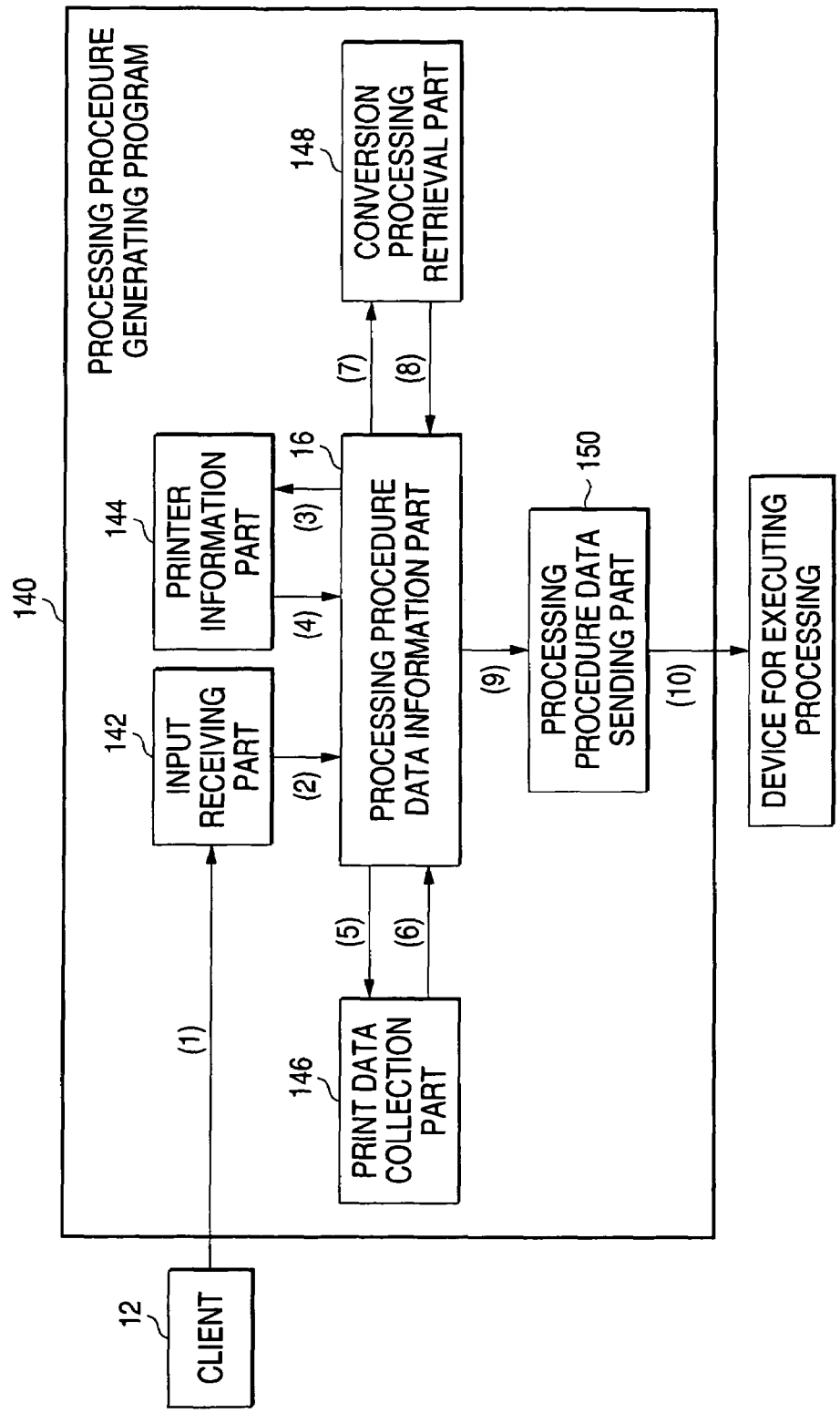
FIG. 9 is a diagram showing a configuration of a processing procedure generation program executed in the processing procedure generator shown in FIG. 6.

FIG. 9 is a diagram showing a configuration of a processing procedure generation program 140 executed in the processing procedure generator 14 shown in FIG. 6.

As shown in FIG. 9, the processing procedure generation program 140 comprises an input receiving part 142, a printer information part 144, a print data collection part 146, a conversion processing retrieval part 148, a processing procedure data sending part 150 and a processing procedure data information part 16.

Figure 10:
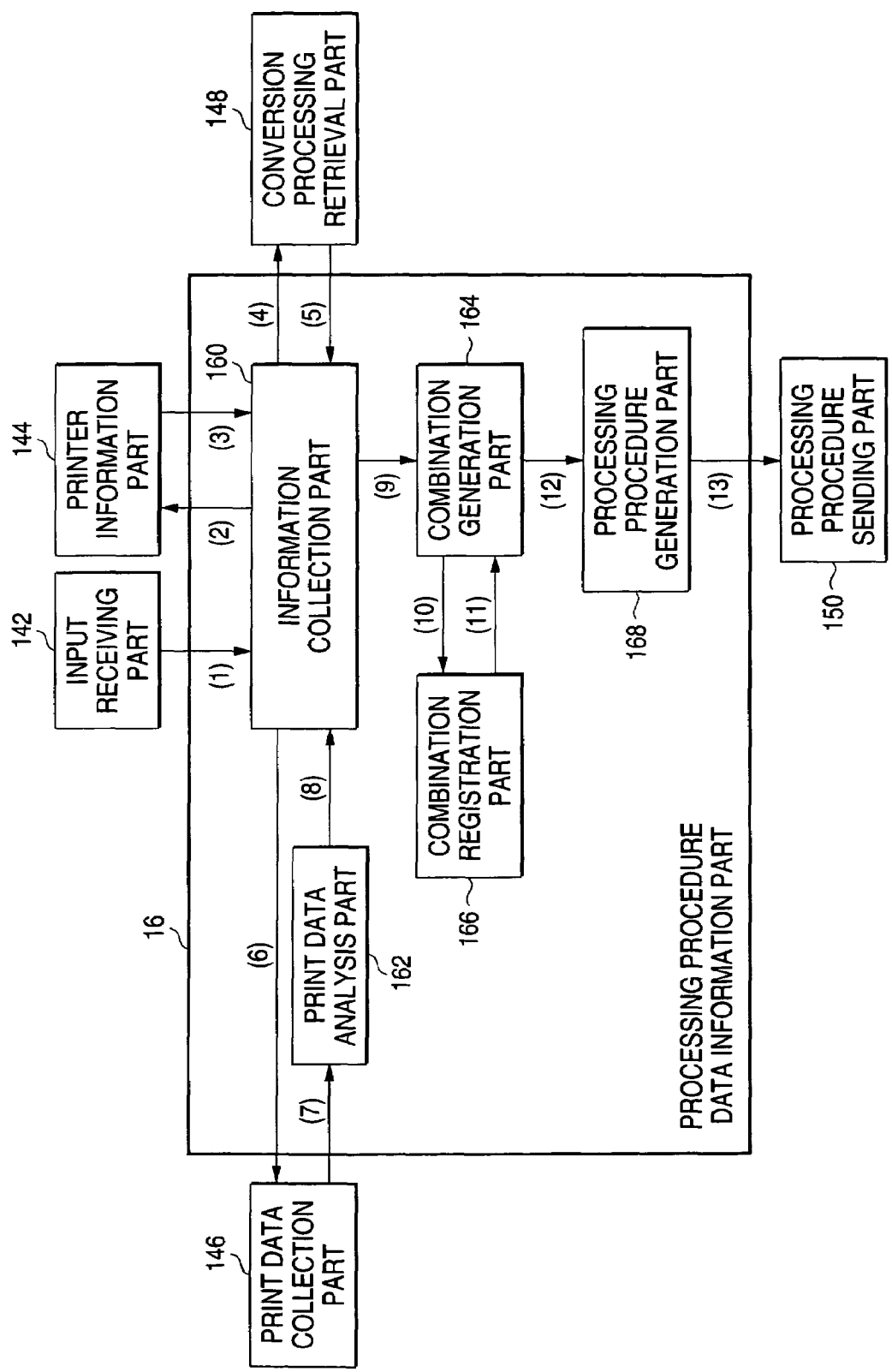
FIG. 10 is a diagram showing a configuration of a processing procedure data information part shown in FIG. 9.

FIG. 10 is a diagram showing a configuration of the processing procedure data information part 16 shown in FIG. 9.

As shown in FIG. 10, the processing procedure data information part 16 comprises an information collection part 160, a print data analysis part 162, a combination generation part 164, a combination registration part 166 and a processing procedure generation part 168.

The processing procedure generation program 140 is supplied to the processing procedure generator 14 through, for example, a record medium 132, and is loaded into the memory 104 and is executed.

When specified information is received from the client device 12, the input receiving part 142 outputs the received specified information to the processing procedure data information part 16 (FIG. 9(1), (2)).

In the processing procedure data information part 16, the information collection part 160 inquires about information on a printer with respect to the printer information part 144 (FIG. 10(2)).

The printer information part 144 stores information on an address of a printer connected to the printing system 1 and the attribute (for example, a print data format capable of interpretation) by input of a user or retrieval of a network configuration of the printing system 1.

When inquiry about the information on the printer is made from the information collection part 160 of the processing procedure data information part 16, the printer information part 144 retrieves the stored information and returns the information (information on the printer 26 in an example shown in FIG. 6) on the printer obtained as a result of the retrieval to the information collection part 160 of the processing procedure data information part 16 (FIG. 9(3), (4) and FIG. 10(2), (3)).

Incidentally, when a proper printer has not been found as a result of the retrieval, the printer information part 144 returns an error to the information collection part 160, and the processing procedure generation program 140 completes the processing.

The print data collection part 146 receives a part of the print data stored by each of the data server devices and a name indicated by the print data by making inquiries about each of the data server devices (data server devices 18 in an example shown in FIG. 6) connected to the printing system 1.

The print data collection part 146 associates an address of each of the data server devices with a part of the print data stored by each of the data server devices and the name indicated by the print data and stores them.

When a request of retrieval of the print data is received by specifying the name indicated by the print data from the information collection part 160 of the processing procedure data information part 16, the print data collection part 146 retrieves the stored name indicated by the print data and determines which data server device the print data of the retrieval request has been held in and returns an address of the data server device holding the print data and a part of the print data to the print data analysis part 162 of the processing procedure data information part 16 (FIG. 9(5), (6) and FIG. 10(6), (7))

Incidentally, when a data server device and a part of the print data have not been found as a result of the retrieval, the print data collection part 146 returns an error to the information collection part 160, and the processing procedure generation program 140 completes the processing.

When an address of the data server device holding the print data and a part of the print data are received from the print data collection part 146, the print data analysis part 162 analyzes a part of the print data and determines a format of the print data and outputs a determination result to the information collection part 160 (FIG. 10(8)).

The information collection part 160 outputs information on the printer (printer 26) from the printer information part 144 and a format of the print data from the print data analysis part 162 to the conversion processing retrieval part 148 (FIG. 9(7) and FIG. 10(4)).

The conversion processing retrieval part 148 stores information indicating how the print data of any format can be converted and printed by a desired printer in, for example, a table form, and retrieves the stored information using information inputted from the information collection part 160, and returns conversion information indicating how the print data to be printed can be processed and printed by the printer 26 to the information collection part 160 of the processing procedure data information part 16 (FIG. 9(8) and FIG. 10 (5)).

The combination generation part 164 registers information (combination information) indicating which data server device 18, processor 22 and printer 26 may be combined and used to convert the print data of various formats into a format suitable for a desired printer in the combination registration part 166.

When the information collection part 160 outputs conversion information to the combination generation part 164 and requests retrieval of the combination information registered in the combination registration part 166 (FIG. 10(9)), the combination generation part 164 retrieves the combination registration part 166 based on the conversion information, and acquires a combination of the optimum processors 22 and combination information indicating their processing order, and outputs them to the processing procedure generation part 168 (FIGS. 10(10) to (12)).

Processing of the combination generation part 164 shown in FIG. 10 will be described further with reference to FIG. 11.

Figure 11:
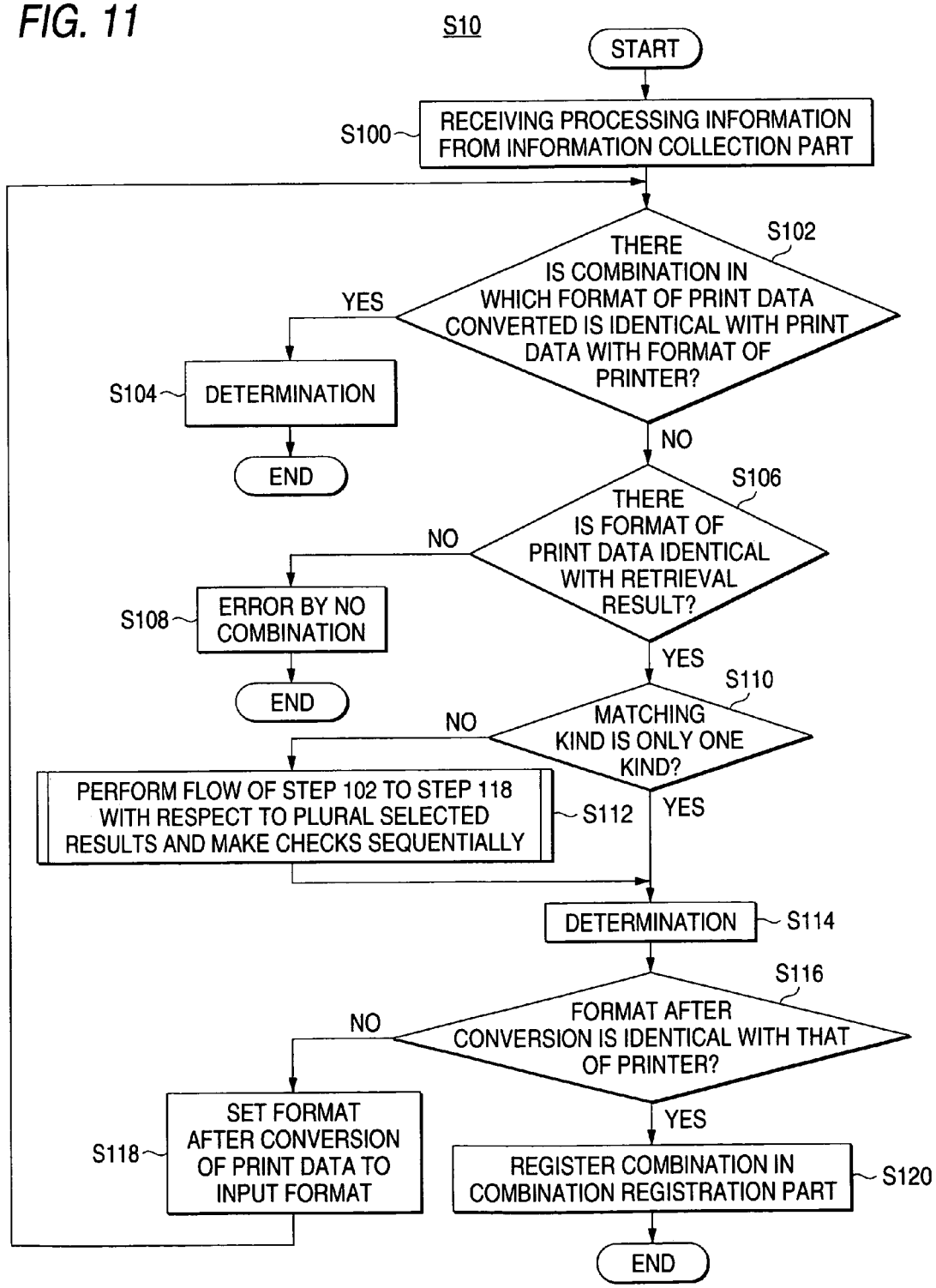
FIG. 11 is a flowchart showing processing (S10) of a combination generation part shown in FIG. 10.

FIG. 11 is a flowchart showing the processing of the combination generation part 164 shown in FIG. 10.

As shown in FIG. 11, in processing of step 100 (S100), the combination generation part 164 receives the conversion information from the information collection part 160.

In step 102 (S102), the combination generation part 164 retrieves the combination registration part 166 and decides whether or not a combination of conversion processing, which can convert the format of the print data to be printed into a format of the print data suitable for the (desired) printer 26, has already been registered in the combination registration part 166.

In step 106 (S106), the combination generation part 164 decides whether or not conversion processing of which a format of the print data before converted is identical with the format of the print data to be printed exists.

The combination generation part 164 proceeds to processing of S110 if the combination which coincides in the format, and proceeds to processing of S108 otherwise.

In step 108 (S108), the combination generation part 164 decides that there is no suitable combination, and returns an error message to the information collection part 160 to complete the processing.

In step 110 (S110), the combination generation part 164 decides whether the registered conversion processing of which the format of the print data before converted is identical with the format of the print data to be printed is one kind or not.

The combination generation part 164 proceeds to processing of S114 if it is one kind, and proceeds to processing of S112 otherwise.

In step 112 (S112), results of plural retrieval is used one by one to perform a process as with a flow of step 102 to step 108. The flow of step 102 to step 118 is sequentially performed with respect to results in which plural retrieval matching with a format of the print data is performed and a combination capable of being used among the retrieved results is searched until the combination in which a format after converted matches with a format of the printer is found.

In step 114 (S114), a format before and after conversion is determined by step 110 (S110) or step 112 (S112).

Subsequent to step 116 (S116), a combination of the next format conversion is searched. When a format of the print data after conversion processing in step 116 is identical with the format of the print data suitable for the desired printer, all the combinations are determined and completed since there is no need to perform further conversion processing. That is, it is determined that the combinations of conversion found at present are performed, and otherwise, continuous conversion processing is still performed in addition to the combinations of conversion found at present, so that a combination of the next conversion processing is searched.

In step 116 (S116), the combination generation part 164 decides whether or not a format of the print data after performing the combination of conversion processing obtained in processing of S114 is suitable for the printer 26.

The combination generation part 164 proceeds to processing of S120 if it is suitable, and proceeds to processing of S118 otherwise.

In step 118 (S118), the combination generation part 164 sets the combination of conversion processing obtained in processing of S114 to a format of the print data to be printed, and proceeds to processing of S102.

In step 120 (S120), the combination generation part 164 registers the combination of conversion processing obtained in processing of S114 in the combination registration part 166.

The processing procedure data generation part 168 (FIG. 10) generates the processing procedure data shown in FIG. 8 according to the combination information inputted from the combination generation part 164 (FIG. 9(9) and FIG. 10(13)), and outputs the data to processors for performing processing, namely the data server device 18, the processors 22 and the printer 26 through the processing procedure data sending part 150 (FIG. 9(10)).

[Data Server Device 18]

The data server device 18 (FIG. 6) receives processing procedure data from the processing procedure generator 14, and retrieves print data according to a command (sending of print data) to the data server device 18, and acquires the print data specified by a name indicated by the print data included in the processing procedure data.

Further, when the print data is acquired normally, the data server device 18 writes the fact that the print data could be acquired normally into a portion of answer information included in a command to the data server device 18.

The data server device 18 prefixes the processing procedure data to the acquired print data body as shown in FIG. 8, and performs sending to a device (processor 22-1) whose address is indicated next to the data server device 18 in the processing procedure data as shown in FIG. 6(5).

The data server device 18 will be further described below with reference to FIG. 12.

Figure 12:
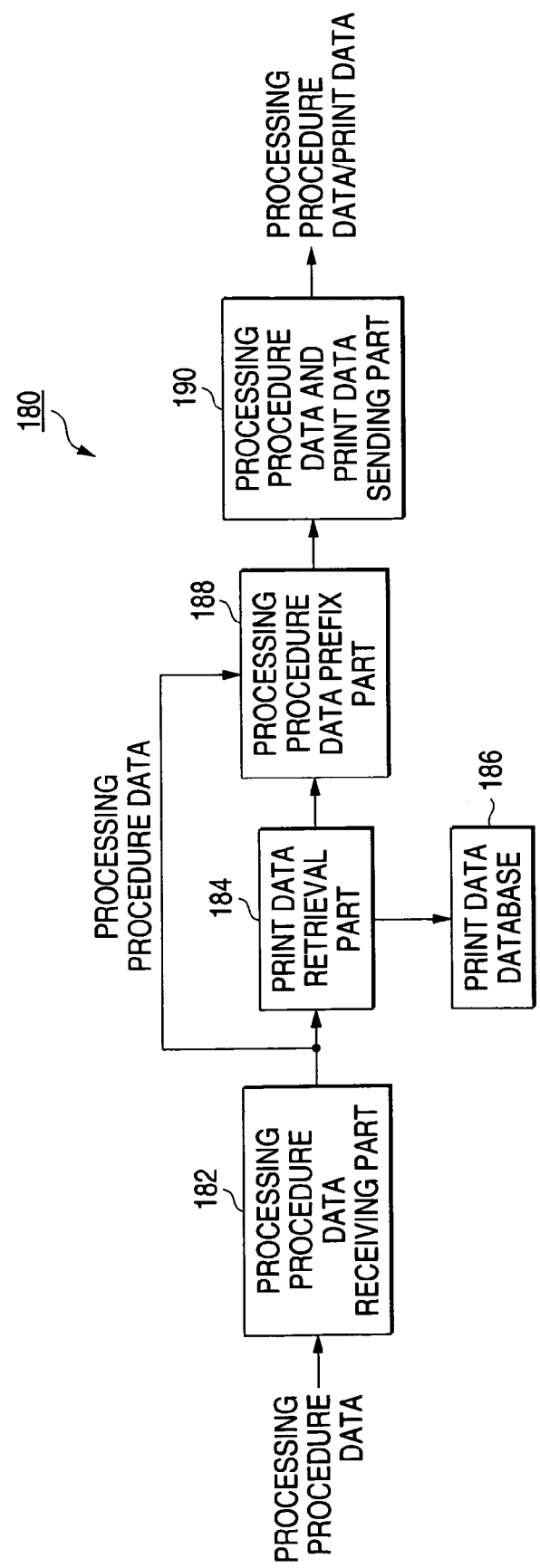
FIG. 12 is a diagram showing a configuration of a print data retrieval program executed by a data server device shown in FIG. 6.

FIG. 12 is a diagram showing a configuration of a print data retrieval program 180 executed by the data server device 18 shown in FIG. 6.

As shown in FIG. 12, the print data retrieval program 180 comprises a processing procedure data receiving part 182, a print data retrieval part 184, a print data database 186, a processing procedure data prefix part 188, and a processing procedure data and print data sending part 190.

The print data retrieval program 180 is supplied to the data server device 18 through, for example, the record medium 132, and is loaded into the memory 104 and is executed.

The processing procedure data receiving part 182 receives the processing procedure data (FIG. 8) from the processing procedure generator 14, and outputs the data to the print data retrieval part 184 and the processing procedure data prefix part 188.

The print data database 186 associates print data with a name indicated by the print data and stores them, and the print data retrieval part 184 retrieves the print data database 186 based on the name indicated by the print data included in the processing procedure data inputted from the processing procedure data receiving part 182 and acquires print data of the name indicated by the print data and outputs the data to the processing procedure data prefix part 188.

The processing procedure data prefix part 188 prefixes the processing procedure data inputted from the processing procedure data receiving part 182 to the print data body inputted from the print data retrieval part 184 as shown in FIG. 8, and further writes information whether the print data could be retrieved normally into answer information included in the command to the data server device 18, and outputs the information to the processing procedure data and print data sending part 190.

The processing procedure data and print data sending part 190 sends the processing procedure data inputted from the processing procedure data prefix part 188 and the print data body to the processor 22-1 (FIG. 6) which next performs processing.

[Processor 22-1]

The processor 22-1 (FIG. 6) performs processing such as N-up with respect to a print data body according to a command to the processor 22-1 when receiving print data to which processing procedure data is prefixed from the data server device 18.

When this processing is completed normally, the processor 22-1 writes the fact that the processing is completed normally into answer information included in a command to the processor 22-1.

The processor 22-1 sends the processed print data to a device (processor 22-2) whose address is indicated next to the processor 22-1 in the processing procedure data as shown in FIG. 6(6).

[Processor 22-2]

The processor 22-2 (FIG. 6) performs processing for further converting the print data body in which the processing of N-up is performed according to the command to the processor 22-1 into a format suitable for the printer 26 when receiving the print data to which the processing procedure data is prefixed from the processor 22-1.

When this processing is completed normally, the processor 22-2 writes the fact that the processing is completed normally into answer information included in a command to the processor 22-2.

The processor 22-2 sends the processed print data to a device (printer 26) whose address is indicated next to the processor 22-2 in the processing procedure data as shown in FIG. 6(7).

Processing of the processors 22 will be further described with reference to FIGS. 13 and 14.

Figure 13:
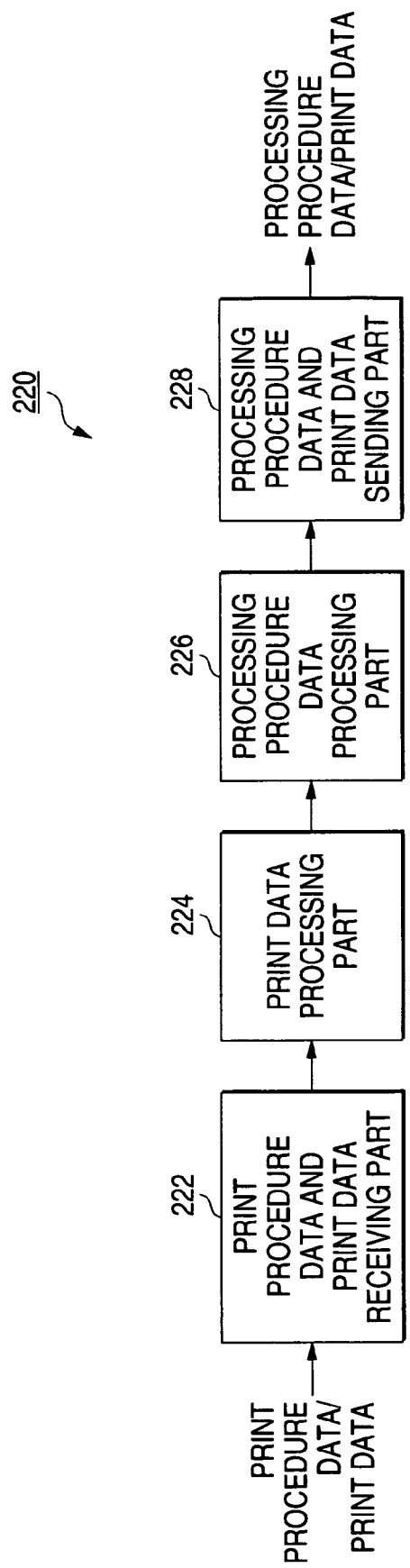
FIG. 13 is a diagram showing a configuration of a conversion processing program executed in a processor (FIG. 6)

FIG. 13 is a diagram showing a configuration of a conversion processing program 220 executed in the processors 22 (FIG. 6).

Figure 14:
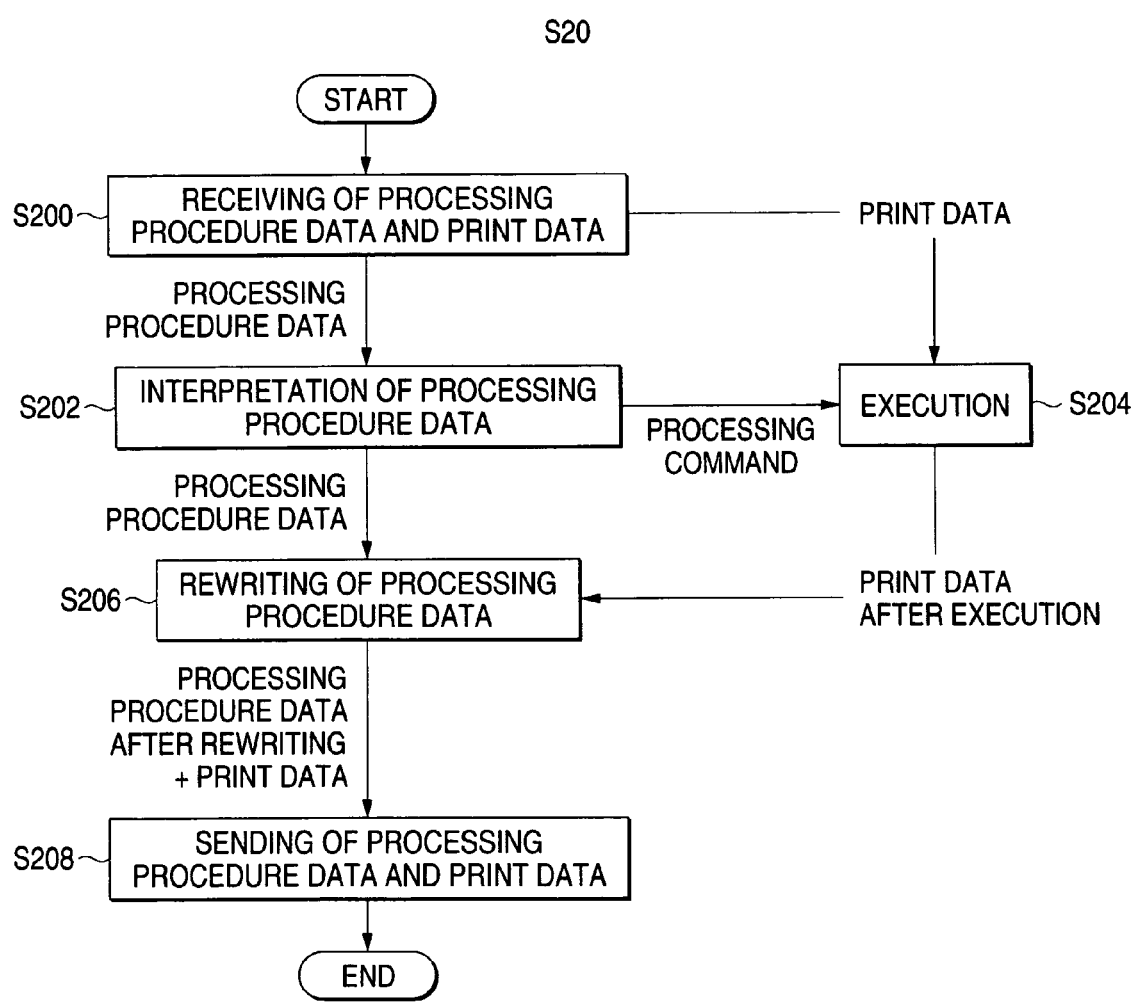
FIG. 14 is a flowchart showing processing (S20) of the processor (FIG. 6)

FIG. 14 is a flowchart showing processing (S20) of the processors 22.

As shown in FIG. 13, the conversion processing program 220 comprises a processing procedure data and print data sending part 228.

The conversion processing program 220 is supplied to the processors 22 through, for example, the record medium 132, and is loaded into the memory 104 and is executed.

A processing procedure data and print data receiving part 222 receives processing procedure data and print data (FIG. 8) from the data server device 18, and outputs the data to a print data processing part 224 (FIG. 14, S200).

The print data processing part 224 performs the processing indicated by a command inputted from the processing procedure data and print data receiving part 222 with respect to the print data, and outputs the processed print data to a processing procedure data processing part 226 (FIG. 14, S202, S204).

The processing procedure data processing part 226 writes information whether the processing has been completed normally into answer information on the processing procedure data prefixed to the print data body, and outputs the information to the processing procedure data and print data sending part 228 (FIG. 14, S206).

The processing procedure data and print data sending part 228 sends the processing procedure data and the print data inputted from the processing procedure data processing part 226 to the processor 22-2 which next performs processing or the printer 26 (FIG. 6) (FIG. 14, S208).

[Printer 26]

Figure 15:
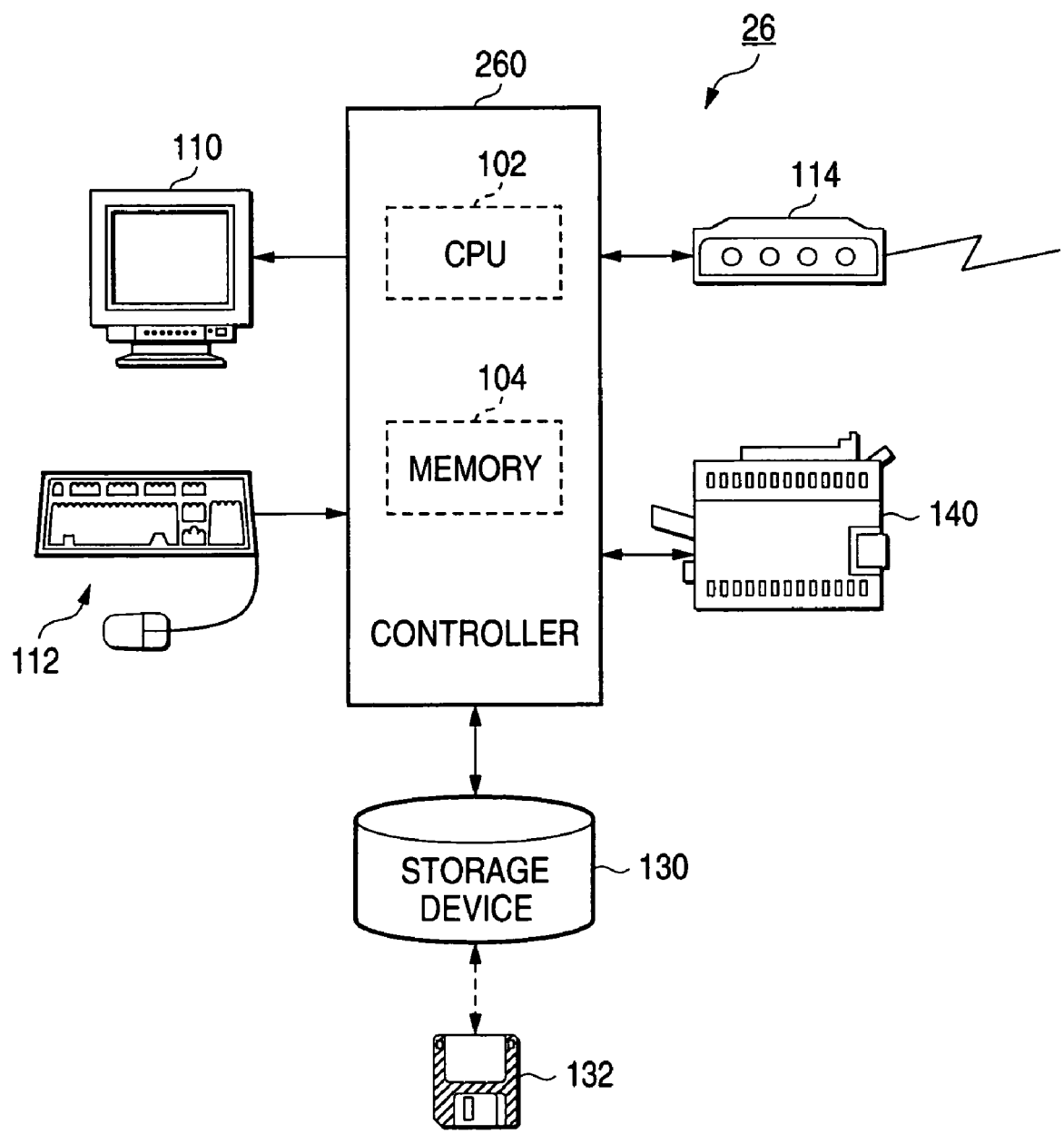
FIG. 15 is a diagram showing a hardware configuration of a printer (FIGS. 6, 18 and 20)

FIG. 15 is a diagram showing a hardware configuration of the printer 26 shown in FIG. 6.

Incidentally, in FIG. 15, like reference characters are designated to those similar to the components of the client device 12 etc. shown in FIG. 7 of the components of the printer 26.

As shown in FIG. 15, the client device 12 comprises a controller 260 including a CPU 102 and memory 104, a display device 110, an input device 112, a communication device 114, a storage device 130 and a printer 140.

That is, the printer 26 has a configuration acting as a general printer capable of communicating with other nodes such as the client device 12 through a network 10.

The printer 26 prints the print data according to a command (printing) to the printer 26 when receiving the print data to which the processing procedure data is prefixed from the processor 22-2.

When the printing is completed, the printer 26 notifies the client device 12 of the completion of the printing.

[Operation of Printing System 1]

Operations of the printing system 1 will be described below throughout the whole.

Figure 16:
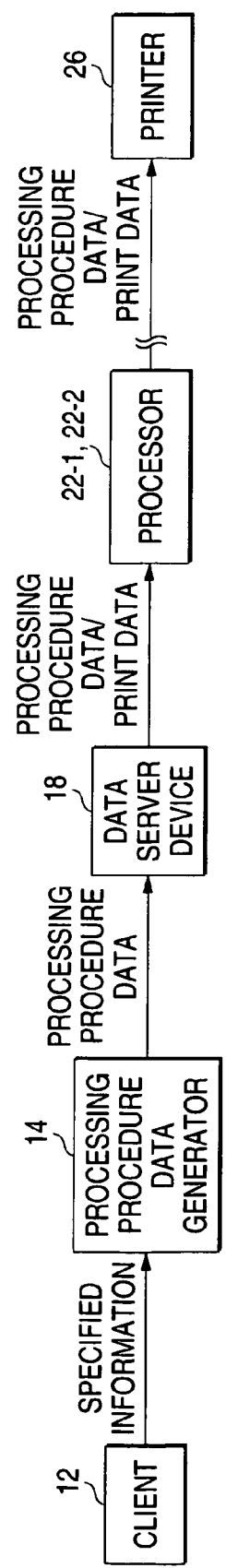
FIG. 16 is a diagram describing operations of the printing system (FIG. 6)

FIG. 16 is a diagram describing operations of the printing system 1 shown in FIG. 6.

Figure 17:
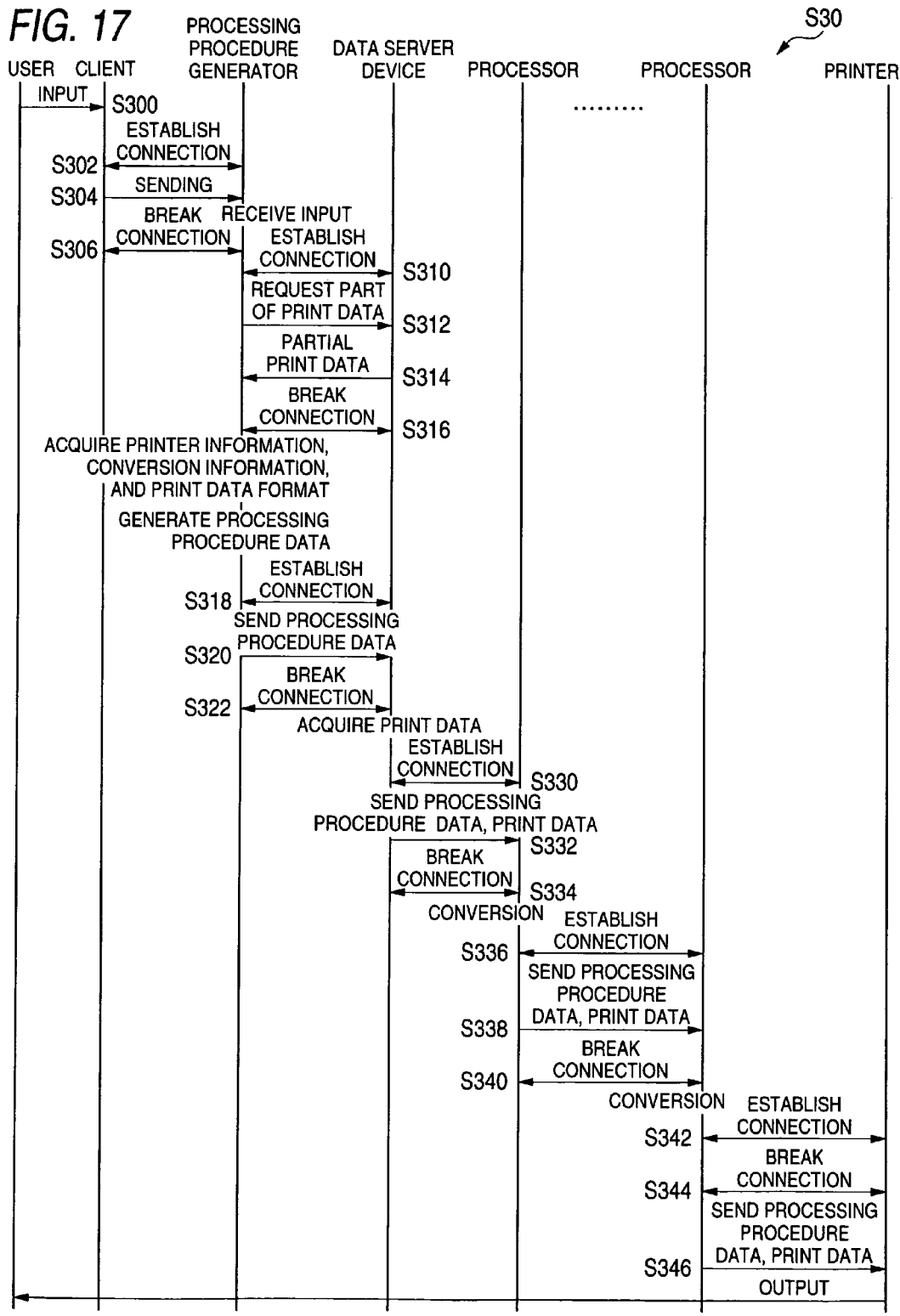
FIG. 17 is a diagram showing a communication sequence (S30) of the printing system (FIG. 6)

FIG. 17 is a diagram showing a communication sequence (S30) of the printing system 1.

As shown in FIG. 16, when an operation of a user is received, the client device 12 sends specified information to the processing procedure generator 14 and requests printing of print data from the processing procedure generator 14 (FIG. 17, S300 to S306).

The processing procedure generator 14 generates processing procedure data shown in FIG. 8 and outputs the data to the data sever device 18 (FIG. 17, S310 to S322).

A device (data sever device 18) which first performs processing searches the print data indicated by a name of the print data included in the processing procedure data, and prefixes the processing procedure data to the print data, and sends the data to the processor 22-1.

A processor (processor 22-1) which next performs processing receives the processing procedure data and the print data from the data sever device 18, and performs processing (for example, N-up) indicated by a command of the processing procedure data with respect to the print data body, and sends the data to the processor 22-2.

A device (processor 22-2) which next performs processing receives the processing procedure data and the print data from the processor 22-1, and performs processing (for example, format conversion) indicated by a command of the processing procedure data with respect to the print data body, and sends the data to the printer 26 (FIG. 17, S330 to S346 above).

The printer 26 receives the processing procedure data and the print data from the processor 22-2, and prints the print data according to a command of the processing procedure data.

Second Embodiment

A second embodiment of the invention will be described below.

Figure 18:
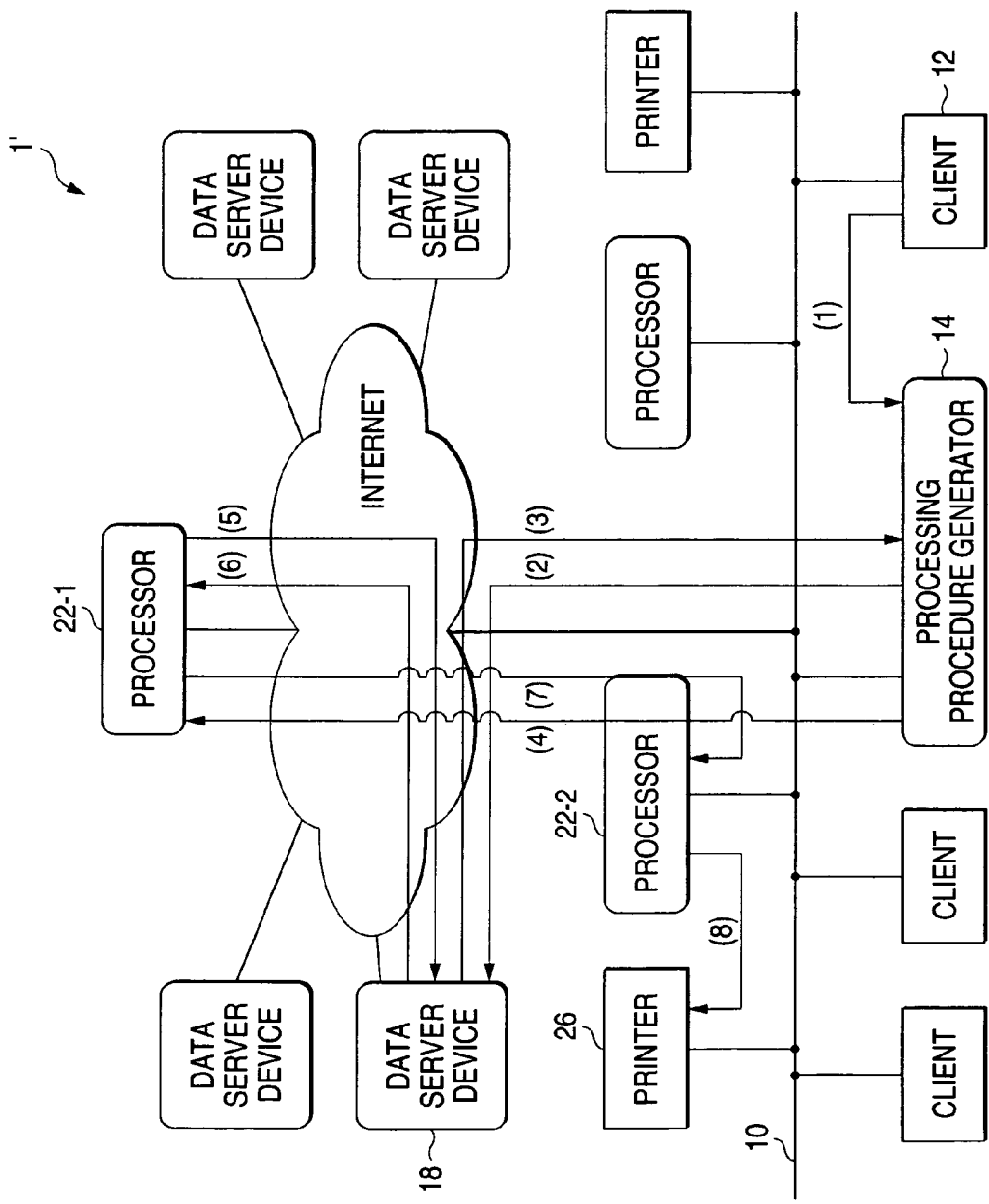
FIG. 18 is a diagram showing a configuration of a second printing system according to the invention.

FIG. 18 is a diagram showing a configuration of a second printing system 1' according to the invention.

In FIG. 18, like reference characters are designated to those similar to the components of the client device 12 etc. shown in FIG. 6.

[Processing Procedure Generator 14]

A processing procedure generator 14 performs similar operations in the printing system 1 shown in FIG. 6.

Based on the determination, the processing procedure generator 14 further generates processing procedure data including an address for specifying a device to perform processing, a command for specifying processing to be performed by a device, a name indicated by print data to be printed and answer information into which a result of processing is written every device in order of processing as illustrated in FIG. 8.

In an example shown in FIG. 18, processing procedure data is generated in the processing procedure generator 14 and is sent to processors 22. The processors 22 acquire print data from a data server device 18 and processing is performed in order of the processors 22-1, 22-2 and a printer 26, so that commands to each the device are held in the processing procedure data in this order.

The processing procedure generator 14 sends the generated processing procedure data to the first processors 22-1 through a network as shown in FIG. 18(4).

[Data Server Device 18]

The data server device 18 (FIG. 18) receives processing procedure data from the processors 22 (FIG. 18(5)), and retrieves print data according to a command (sending of print data) of the data server device 18, and acquires the print data specified by a name indicated by the print data included in the processing procedure data.

Further, when the print data is acquired normally, the data server device 18 writes the fact that the print data could be acquired normally into a portion of answer information included in a command to the data server device 18.

The data server device 18 prefixes the processing procedure data to the acquired print data body, and performs sending to a device (processor 22-1) whose address is indicated next to the data server device 18 in the processing procedure data as shown in FIG. 6(5) (FIG. 18(6)).

Further, the data server device 18 performs similar operations in the printing system 1 shown in FIG. 6.

[Processor 22-1]

When the processor 22-1 (FIG. 18) receives processing procedure data from the processing procedure generator 14 and sends the processing procedure data to the data server device 18 and receives print data to which the processing procedure data is prefixed from the data server device 18, the processor 22-1 performs processing such as N-up with respect to a print data body according to a command to the processor 22-1.

When this processing is completed normally, the processor 22-1 writes the fact that the processing is completed normally into answer information included in a command to the processor 22-1.

The processor 22-1 sends the processed print data to a device (22-2) whose address is indicated next to the processor 22-1 in the processing procedure data as shown in FIG. 18 (7).

[Processor 22-2]

The processor 22-2 (FIG. 18) performs processing for further converting the print data body in which the processing of N-up is performed according to the command to the processor 22-1 into a format suitable for the printer 26 when receiving the print data to which the processing procedure data is prefixed from the processor 22-1.

When this processing is completed normally, the processor 22-2 writes the fact that the processing is completed normally into answer information included in a command to the processor 22-2.

The processor 22-2 sends the processed print data to a device (printer 26) whose address is indicated next to the processor 22-2 in the processing procedure data as shown in FIG. 18(8).

Further, the processors 22-1, 22-2 perform operations similar to those of the processors 22 in the printing system 1 shown in FIG. 6.

Figure 19:
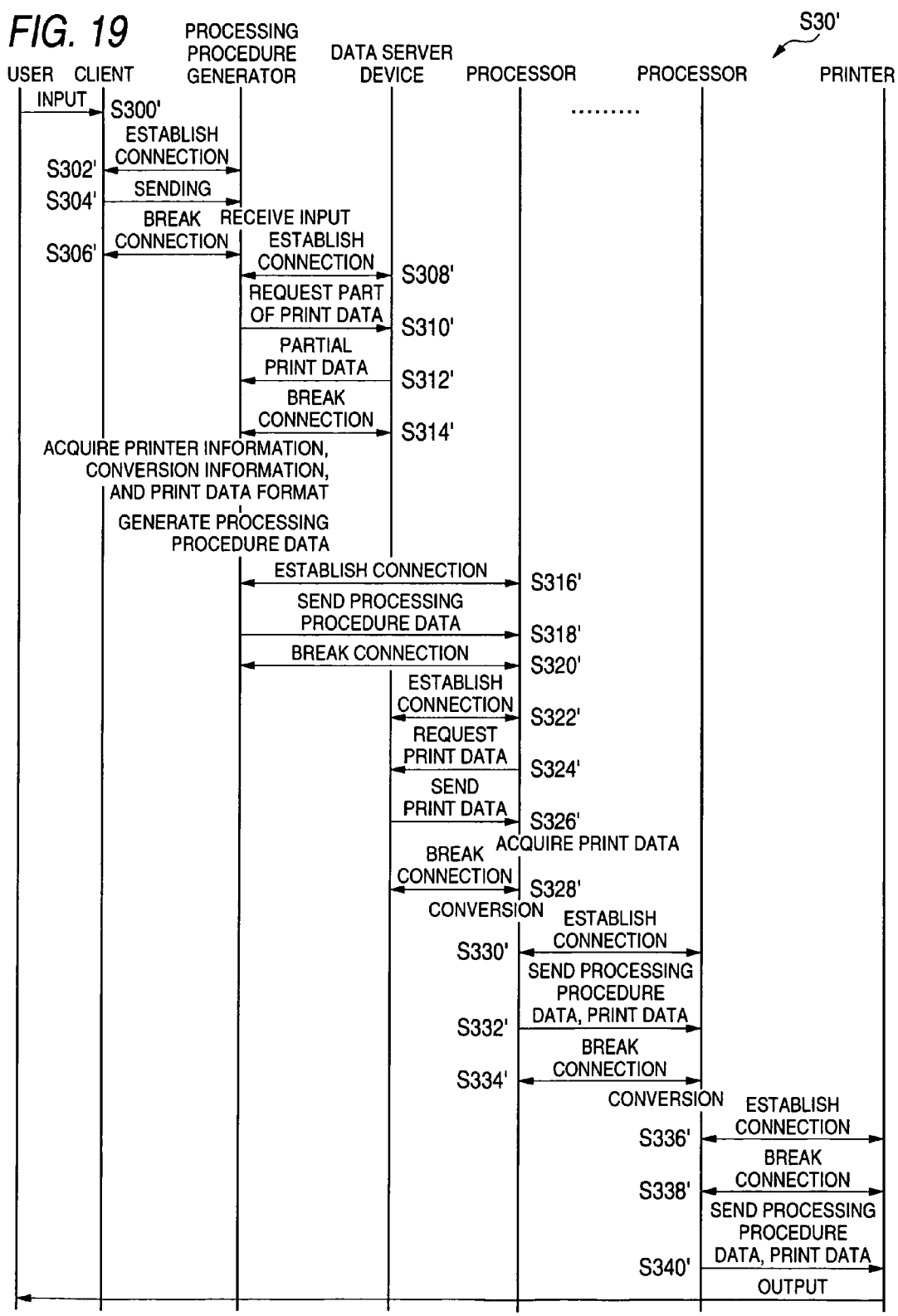
FIG. 19 is a diagram showing a communication sequence (S30') of the printing system (FIG. 18)

FIG. 19 is a diagram showing a communication sequence (S30') of the printing system 1' shown in FIG. 18.

The printing system 1' shown in FIG. 18 conducts communications between each component and executes printing, for example, as shown in FIG. 19.

Third Embodiment

A third embodiment of the invention will be described below.

Figure 20:
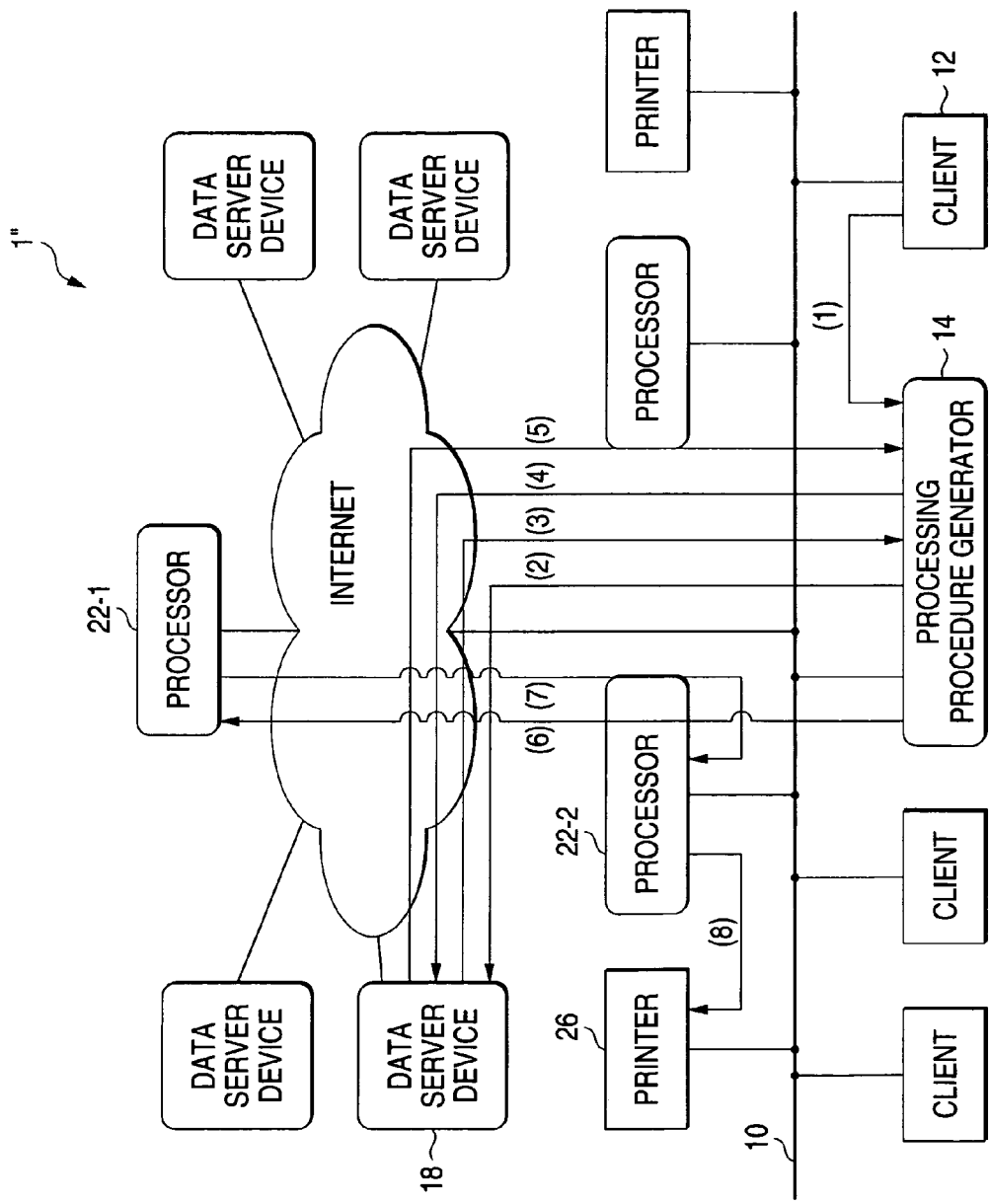
FIG. 20 is a diagram showing a configuration of a third printing system according to the invention.

FIG. 20 is a diagram showing a configuration of a third printing system 1" according to the invention.

In FIG. 20, like reference characters are designated to those similar to the components of the client device 12 etc. shown in FIG. 6.

[Processing Procedure Generator 14]

A processing procedure generator 14 performs similar operations in the printing system 1 shown in FIG. 6.

Based on the determination, the processing procedure generator 14 further generates processing procedure data including an address for specifying a device to perform processing, a command for specifying processing to be performed by a device, a name indicated by print data to be printed and answer information into which a result of processing is written every device in order of processing as illustrated in FIG. 8.

In an example shown in FIG. 20, processing procedure data is generated in the processing procedure generator 14. After the processing procedure generator 14 acquires the print data from the data server device 18, processing is performed in order of processors 22-1, 22-2 and a printer 26, so that commands to each the device including the data server and the processing procedure generator are held in the processing procedure data in this order.

The processing procedure generator 14 sends the generated processing procedure data to the data server device 18 through a network as shown in FIG. 20(4).

[Data Server Device 18]

The data server device 18 (FIG. 20) receives processing procedure data from the processing procedure generator 14, and retrieves print data according to a command (sending of print data) of the data server device 18, and acquires the print data specified by a name indicated by the print data included in the processing procedure data.

Further, when the print data is acquired normally, the data server device 18 writes the fact that the print data could be acquired normally into a portion of answer information included in a command to the data server device 18.

The data server device 18 prefixes the processing procedure data to the acquired print data body, and performs sending to a device (processing procedure generator 14) whose address is indicated next to the data server device 18 in the processing procedure data as shown in FIG. 20(5).

Further, the data server device 18 performs similar operations in the printing system 1 shown in FIG. 6.

[Processor 22-1]

The processor 22-1 (FIG. 20) performs processing such as N-up with respect to a print data body according to a command to the processor 22-1 when receiving print data to which processing procedure data is prefixed from the processing procedure generator 14.

When this processing is completed normally, the processor 22-1 writes the fact that the processing is completed normally into answer information included in a command to the processor 22-1.

The processor 22-1 sends the processed print data to a device (22-2) whose address is indicated next to the processor 22-1 in the processing procedure data as shown in FIG. 20 (7).

[Processor 22-2]

The processor 22-2 (FIG. 20) performs processing for further converting the print data body in which the processing of N-up is performed according to the command to the processor 22-1 into a format suitable for the printer 26 when receiving the print data to which the processing procedure data is prefixed from the processor 22-1.

When this processing is completed normally, the processor 22-2 writes the fact that the processing is completed normally into answer information included in a command to the processor 22-2.

The processor 22-2 sends the processed print data to a device (printer 26) whose address is indicated next to the processor 22-2 in the processing procedure data as shown in FIG. 20(8).

Further, the processors 22-1, 22-2 perform operations similar to those of the processors 22 in the printing system 1 shown in FIG. 6.

FIG. 21 is a diagram showing a communication sequence (S30") of the printing system 1" shown in FIG. 20.

The printing system 1" shown in FIG. 20 conducts communications between each component and executes printing, for example, as shown in FIG. 21.

MODIFIED EXAMPLE 1

Incidentally, the print data analysis part 162 can decide a format of the print data not only by analyzing a part of the print data but also by deciding an extension of a name indicated by the print data.

MODIFIED EXAMPLE 2

The processing procedure generator 14 may make the processing procedure data include information on a client which has requested printing. A data server device or a processing procedure device notifies the processing procedure generator 14 of occurrence of an error when the error occurs in its own processing.

The processing procedure generator 14 notified of the error generates and resends processing procedure data newly when processing can be performed without using the device in which the error has occurred.

The client, which has required the print, is notified of the occurrence of the error when processing cannot be performed.

The data server device or the processing procedure device may notify the client which has requested the printing directly other than the processing procedure generator 14 of the occurrence of the error when the error occurs in its own processing, and prompt the client to make a change in the printer for output or a change in the processing.

As described above, in accordance with a printing system and its method according to the invention, processing with respect to print data can be performed using each device through a network without increasing a load of a printer and network traffic and the processed print data can be printed.

Also, in accordance with a printing system and its method according to the invention, plural processing can be performed with respect to print data to then do printing using plural devices through a network.

Also, in accordance with a printing system and its method according to the invention, plural processing can be performed with respect to print data in combination flexibly to do printing by using plural devices through a network.

MODIFIED EXAMPLE 3

Each of processors may process a print data acquired from the data server device and then may return the processed print data to the data server device and transmit only the processing procedure data to next processor.

What is claimed is:

1. A printing system, comprising:
   a processing procedure generator;
   a plurality of processors, at least a first one of the plurality of processors performing at least one of conversion processing or format processing of print data;
   a printer; and
   a data server device storing the print data,
   wherein the processing procedure generator, the plurality of processors, the printer, and the data server device are separate from each other and are connected to each other through a network;
   wherein the processing procedure generator comprises:
      a processing procedure generation section for generating processing procedure data indicating a procedure for processing print data to be printed by the printer; and
      a processing procedure sending section for sending the generated processing procedure data to the data server device;
   wherein the data server device comprises:
      a processing procedure receiving section for receiving the processing procedure data;
      a print data acquisition section for acquiring the print data; and
      a processing sending section for sending the processing procedure data and the print data to the at least first one of the plurality of processors that first performs at least one of conversion processing or format processing of the print data;
   wherein at least one of the plurality of processors comprises:
      a first receiving section for receiving the sent processing procedure data and the print data;
      a processing section for performing a predetermined processing with respect to the received print data; and a first sending section for sending the processed print data and the received processing procedure data to at least one of the plurality of processors, which next performs at least one of format processing or conversion processing of the print data, and the printer in accordance with the processing procedure data; and wherein the printer receives and prints the processed print data.

2. The printing system according to claim 1, further comprising a client device for requesting the processing procedure generator to process and print the print data, wherein the processing procedure generator further comprises:
a first database section for recording processing procedure data; and
a request receiving section for receiving a request for processing and printing of print data; and wherein the processing procedure generation section retrieves the first database section based on the received request to generate processing procedure data indicating the processing procedure for processing the print data.

3. The printing system according to claim 1,
wherein the processing procedure data comprises:
device data specifying at least one of the plurality of processors and the printer; and
processing data specifying processing with respect to the print data performed by the specified at least one of the plurality of processors and the printer;
and the specified processor performs the processing specified by the processing data with respect to the received print data and sends the processed print data and the processing procedure data to one of the processor which next performs processing and the printer and is specified by the device data.

4. The printing system according to claim 3, wherein the specified processor adds to the processing procedure data completion data indicating that processing with respect to the print data by the specified processor is completed.

5. The printing system according to claim 1,
wherein the processing procedure generation section of the processing procedure generator adds to the processing procedure data name data indicating a name of the print data to be processed and printed; and
wherein the print data acquisition section of the data server device acquires the print data indicated by the name data added to the received processing procedure data;
wherein the data server device further has a second database section for storing at least one print data associated with the name data indicating the name of the print data and sends the print data indicated by the name data added to the processing procedure data to the print data acquisition section.

6. A printing system comprising:
a processing procedure generator;
a plurality of processors, at least a first one of the plurality of processors performing at least one of conversion processing or format processing of print data;
a printer; and
a data server device storing the print data,
wherein the processing procedure generator, the plurality of processors, the printer, and the data server device are separate from each other and are connected to each other through a network;
wherein the processing procedure generator generates processing procedure data indicating a procedure for processing print data to be printed by the printer, acquires the print data from the data server device according to a name of the print data and sends the processing procedure data and the print data to the at least first one of the plurality of processors that first performs at least one of conversion processing or format processing of the print data;
wherein the at least first one of the plurality of processors receives processing procedure data and the print data, performs the processing according to the received processing procedure with respect to the received print data, and sends the processed print data and the received processing procedure data to at least one of the plurality of processors processor which next performs at least one of format processing or conversion processing of the print data and the printer in accordance with the processing procedure data; and
wherein the printer receives and prints the processed print data.

7. A printing system comprising:
a processing procedure generator;
a plurality of processors, at least a first one of the plurality of processors performing at least one of conversion processing or format processing of print data;
a printer; and
a data server device storing the print data,
wherein the processing procedure generator, the plurality of processors, the printer, and the data server device are separate from each other and are connected to each other through a network;
wherein the processing procedure generator generates processing procedure data indicating a procedure for processing print data to be printed by the printer, and sends the processing procedure data with a name of the print data to the processor which first performs processing with respect to the print data;
wherein the at least first one of the plurality of processors receives processing procedure data and the name of the print data, acquires the print data from the data server device according to the received name of the print data, performs a predetermined processing with respect to the received print data, and sends the processed print data and the received processing procedure data to one of the plurality of processors which next performs processing and the printer in accordance with the processing procedure data; and
wherein the printer receives and prints the processed print data.

8. A processing procedure generator connected to a network, comprising:
a processing procedure generation section that generates processing procedure data indicating a procedure for processing print data by a plurality of processors, at least one of the plurality of processors performing at least one of conversion processing or format processing of the print data, and for printing the print data by at least one external device connected to the network according to a request of processing and printing of print data from a client; and
a processing procedure sending section for sending the generated processing procedure data to a first one of the plurality of processors identified in the processing procedure data to provide at least one of conversion processing or format processing of the print data.

9. The print system according to claim 3, wherein at least one of a data server device and a processing procedure device notifies at least one of a processing procedure generator and the client of occurrence of an error when the error occurs in its own processing.

10. The print system according to claim 9,
wherein when an error is notified from one of a data server device and a processing procedure device, the processing procedure generation section generates and sends another processing procedure data to a device first described in the another processing procedure data.

11. The processing procedure generator according to claim 8, further comprising a first database section for recording processing procedure data,
wherein when the processing procedure generation section receives a request for processing and printing of print data, the processing procedure generation section retrieves the first database section based on the received request to generate the processing procedure data indicating the processing procedure for processing the print data.

12. A printing method comprising the steps of:
generating processing procedure data indicating a procedure for processing print data by a plurality of processors, at least one of the plurality of processors performing at least one of conversion processing or format processing of the print data, and for printing the print data by at least one device;
sending the generated processing procedure data to a first one of the plurality of processors identified in the processing procedure data to provide at least one of conversion processing or format processing of the print data;
receiving the sent processing procedure data and the print data by one of the plurality of processors identified;
performing a processing according to the processing procedure data with respect to the received print data;
sending the processed print data and the received processing procedure data to one of the plurality of processors identified which next performs processing and a printer according to the processing procedure data; and
receiving and printing the processed print data by the printer.

13. The printing method according to claim 12, further comprising the steps of:
storing process procedure data;
receiving a request for printing and processing the print data, and
retrieving the process procedure data based on the received request.

14. The printing method according to claim 12,
wherein in the step of generating the processing procedure data and the print data, data device data specifying the processors and the printer and processing data specifying process with respect to the print data are added to the processing procedure data; and
wherein in the step of sending the processed print data and the received processing procedure data, the processed print data and the received processing procedure data are sent to one of the plurality of processors which next performs processing and a printer based upon the device data.

15. The printing method according to claim 14, further comprising the steps of adding to the processing procedure data completion data indicating that processing with respect to the print data by a processor is completed.

16. The printing method according to claim 12, further comprising the steps of:
adding to the processing procedure data name data indicating a name of the print data to be printed;
recording at least one print data associated with the name data indicating the at least one print data;
retrieving the at least one recorded print data and the name data indicating the at least one recorded print data; and
acquiring the print data indicated by the name data added to the processing procedure data.

17. A processing procedure generation method comprising the steps of:
generating processing procedure data indicating a procedure for processing print data by a plurality of processors, at least one of the plurality of processors performing at least one of conversion processing or format processing of the print data, and for printing the print data by at least one external device connected to a network according to a request of processing and printing of print data from a client; and
sending the generated processing procedure data to a first one of the plurality of processors identified in the processing procedure data to provide at least one of conversion processing or format processing of the print data.

18. The processing procedure generation method according to claim 17, further comprising the steps of:
storing processing procedure data performed by the plurality of processors and the printer;
receiving a request for processing and printing of the print data; and
retrieving the processing procedure data based on the received request.

19. A computer readable medium encoded with computer executable instructions for making a computer perform the steps of:
generating processing procedure data indicating a procedure for processing print data by a plurality of processors, at least one of the plurality of processors performing at least one of conversion processing or format processing of the print data, and for printing the print data by at least one device;
sending the generated processing procedure data to a first one of the plurality of processors identified in the processing procedure data to provide at least one of conversion processing or format processing of the print data;
receiving the sent processing procedure data and the print data by one of the plurality of processors identified;
performing a processing procedure with respect to the received print data based on the received processing procedure data;
sending the processed print data and the received processing procedure data to one of the plurality of processors which next performs processing and a printer according to the processing procedure data; and
receiving and printing the processed print data by the printer.

20. A computer readable medium encoded with computer executable instructions for making a computer perform the steps of:
generating processing procedure data indicating a procedure for processing print data by a plurality of processors, at least one of the plurality of processors performing at least one of conversion processing or format processing of the print data, and for printing the print data by at least one external device connected to the network according to a request of processing and printing of print data from a client; and
sending the generated processing procedure data to a first one of the plurality of processors identified in the processing procedure data to provide at least one of conversion processing or format processing of the print data.

* * * * *